US011384203B2

(12) United States Patent
Pacorel (10) Patent No.: US 11,384,203 B2
(45) Date of Patent: *Jul. 12, 2022

(54) BINDER (71) Applicants: KNAUF INSULATION SPRL, Vise (BE); KNAUF INSULATION, INC., Shelbyville, IN (US)

(72) Inventor: Benedicte Pacorel, Auckland (NZ)

(73) Assignees: Knauf Insulation, Inc., Shelbyville, IN (US); Knauf Insulation SPRL, Vise (BE)

(*) Notice: Subject to any disclaimer, the term of this patent is extended or adjusted under 35 U.S.C. 154(b) by 32 days.

This patent is subject to a terminal disclaimer.

(21) Appl. No.: 16/434,072

(22) Filed: Jun. 6, 2019

(65) Prior Publication Data
US 2019/0284337 A1 Sep. 19, 2019
US 2022/0002487 A9 Jan. 6, 2022

Related U.S. Application Data

(63) Continuation of application No. 15/714,150, filed on Sep. 25, 2017, now Pat. No. 10,508,172, which is a continuation of application No. 14/649,452, filed as application No. PCT/EP2013/075378 on Dec. 3, 2013, now abandoned.

(30) Foreign Application Priority Data

Dec. 5, 2012 (GB) .................................. 1221873.1

(51) Int. Cl.
 C07H 11/00 (2006.01)
 C08G 73/02 (2006.01)
 C09J 179/02 (2006.01)
(52) U.S. Cl.
 CPC ........ *C08G 73/0206* (2013.01); *C09J 179/02* (2013.01)
(58) Field of Classification Search
 CPC .................................................. C07H 11/00
 See application file for complete search history.

(56) References Cited

U.S. PATENT DOCUMENTS

| 1,801,052 A | 4/1931 | Meigs |
| 1,801,053 A | 4/1931 | Meigs |
| 1,886,353 A | 11/1932 | Novotny |
| 1,902,948 A | 3/1933 | Castle |
| 1,964,263 A | 6/1934 | Krenke |
| 2,198,874 A | 4/1940 | Leighton |
| 2,215,825 A | 9/1940 | Wallace |
| 2,261,295 A | 11/1941 | Schlack |
| 2,362,086 A | 11/1944 | Eastes |
| 2,371,990 A | 3/1945 | Hanford |
| 2,392,105 A | 1/1946 | Sussman |
| 2,442,989 A | 6/1948 | Sussman |
| 2,500,665 A | 3/1950 | Courtright |
| 2,518,956 A | 8/1950 | Sussman |
| 2,875,073 A | 2/1959 | Gogek |
| 2,894,920 A | 7/1959 | Ramos |
| 2,965,504 A | 12/1960 | Gogek |
| 3,038,462 A | 6/1962 | Bohdan |
| 3,138,473 A | 6/1964 | Floyd |
| 3,222,243 A | 12/1965 | Gaston |
| 3,231,349 A | 1/1966 | Stalego |
| 3,232,821 A | 2/1966 | Banks |
| 3,297,419 A | 1/1967 | Eyre, Jr. |
| 3,513,001 A | 5/1970 | Woodhead |
| 3,551,365 A | 12/1970 | Matalon |
| 3,784,408 A | 1/1974 | Jaffe |
| 3,791,807 A | 2/1974 | Etzel |
| 3,802,897 A | 4/1974 | Voigt |
| 3,809,664 A | 5/1974 | Burr |
| 3,826,767 A | 7/1974 | Hoover |
| 3,856,606 A | 12/1974 | Fan |
| 3,867,119 A | 2/1975 | Takeo |
| 3,907,724 A | 9/1975 | Higginbottom |
| 3,911,048 A | 10/1975 | Vargiu |
| 3,919,134 A | 11/1975 | Higginbottom |
| 3,922,466 A | 11/1975 | Bell |
| 3,955,031 A | 5/1976 | Jones |
| 3,956,204 A | 5/1976 | Higginbottom |
| 3,961,081 A | 6/1976 | McKenzie |
| 3,971,807 A | 7/1976 | Brack |
| 4,014,726 A | 3/1977 | Fargo |
| 4,028,290 A | 6/1977 | Reid |
| 4,048,127 A | 9/1977 | Gibbons |
| 4,054,713 A | 10/1977 | Sakaguchi |
| 4,085,076 A | 4/1978 | Gibbons |
| 4,097,427 A | 6/1978 | Aitken |
| 4,107,379 A | 8/1978 | Stofko |
| 4,109,057 A | 8/1978 | Nakamura |
| 4,144,027 A | 3/1979 | Habib |
| 4,148,765 A | 4/1979 | Nelson |
| 4,183,997 A | 1/1980 | Stofko |
| 4,184,986 A | 1/1980 | Krasnobajew |
| 4,186,053 A | 1/1980 | Krasnobajew |
| 4,201,247 A | 5/1980 | Shannon |
| 4,201,857 A | 5/1980 | Krasnobajew |
| 4,217,414 A | 8/1980 | Walon |
| 4,233,432 A | 11/1980 | Curtis, Jr. |

(Continued)

FOREIGN PATENT DOCUMENTS

| AU | 8538765 | 8/1985 |
| AU | 9640921 | 7/1997 |
| CA | 1090026 | 11/1980 |
| CA | 2037214 | 9/1991 |
| CA | 2232334 | 11/1998 |

(Continued)

OTHER PUBLICATIONS

International Search Report and Written Opinion for PCT/US2008/059730, completed Sep. 22, 2008.

(Continued)

*Primary Examiner* — Shaojia A Jiang
*Assistant Examiner* — Everett White
(74) *Attorney, Agent, or Firm* — Knauf Insulation, Inc.; James K. Blodgett; Brandon N. Hudder (57) ABSTRACT

The present disclosure provides for improved binder compositions comprising an amine component, as well as methods for manufacturing articles and collections of matter comprising the disclosed binder compositions.

10 Claims, 3 Drawing Sheets

(56) References Cited

U.S. PATENT DOCUMENTS

| | | |
|---|---|---|
| 4,246,367 A | 1/1981 | Curtis, Jr. |
| 4,259,190 A | 3/1981 | Fahey |
| 4,265,963 A | 5/1981 | Matalon |
| 4,278,573 A | 7/1981 | Tessler |
| 4,296,173 A | 10/1981 | Fahey |
| 4,301,310 A | 11/1981 | Wagner |
| 4,310,585 A | 1/1982 | Shannon |
| 4,322,523 A | 3/1982 | Wagner |
| 4,330,443 A | 5/1982 | Rankin |
| 4,333,484 A | 6/1982 | Keritsis |
| 4,357,194 A | 11/1982 | Stofko |
| 4,361,588 A | 11/1982 | Herz |
| 4,379,101 A | 4/1983 | Smith |
| 4,393,019 A | 7/1983 | Geimer |
| 4,396,430 A | 8/1983 | Matalon |
| 4,400,496 A | 8/1983 | Butler |
| 4,464,523 A | 8/1984 | Neigel |
| 4,506,684 A | 3/1985 | Keritsis |
| 4,520,143 A | 5/1985 | Jellinek |
| 4,524,164 A | 6/1985 | Viswanathan |
| 4,631,226 A | 12/1986 | Jellinek |
| 4,654,259 A | 3/1987 | Stofko |
| 4,668,716 A | 5/1987 | Pepe |
| 4,692,478 A | 9/1987 | Viswanathan |
| 4,714,727 A | 12/1987 | Hume, III |
| 4,720,295 A | 1/1988 | Bronshtein |
| 4,734,996 A | 4/1988 | Kim |
| 4,754,056 A | 6/1988 | Ansel |
| 4,761,184 A | 8/1988 | Markessini |
| 4,780,339 A | 10/1988 | Lacourse |
| 4,828,643 A | 5/1989 | Newman |
| 4,845,162 A | 7/1989 | Schmitt |
| 4,906,237 A | 3/1990 | Johansson |
| 4,912,147 A | 3/1990 | Pfoehler |
| 4,918,861 A | 4/1990 | Carpenter |
| 4,923,980 A | 5/1990 | Blomberg |
| 4,950,444 A | 8/1990 | Deboufie |
| 4,988,780 A | 1/1991 | Das |
| 4,992,519 A | 2/1991 | Mukherjee |
| 5,001,202 A | 3/1991 | Denis |
| 5,013,405 A | 5/1991 | Izard |
| 5,032,431 A | 7/1991 | Conner |
| 5,037,930 A | 8/1991 | Shih |
| 5,041,595 A | 8/1991 | Yang |
| 5,089,342 A | 2/1992 | Dhein |
| 5,095,054 A | 3/1992 | Lay |
| 5,106,615 A | 4/1992 | Dikstein |
| 5,114,004 A | 5/1992 | Isono |
| 5,123,949 A | 6/1992 | Thiessen |
| 5,124,369 A | 6/1992 | Vandichel |
| 5,128,407 A | 7/1992 | Layton |
| 5,143,582 A | 9/1992 | Arkens |
| 5,151,465 A | 9/1992 | Le-Khac |
| 5,167,738 A | 12/1992 | Bichot |
| 5,198,492 A | 3/1993 | Stack |
| 5,217,741 A | 6/1993 | Kawachi |
| 5,218,048 A | 6/1993 | Abe |
| 5,240,498 A | 8/1993 | Matalon |
| 5,278,222 A | 1/1994 | Stack |
| 5,300,144 A | 4/1994 | Adams |
| 5,300,192 A | 4/1994 | Hansen |
| 5,308,896 A | 5/1994 | Hansen |
| 5,318,990 A | 6/1994 | Strauss |
| 5,336,753 A | 8/1994 | Jung |
| 5,336,755 A | 8/1994 | Pape |
| 5,336,766 A | 8/1994 | Koga |
| 5,340,868 A | 8/1994 | Strauss |
| 5,352,480 A | 10/1994 | Hansen |
| 5,367,849 A | 11/1994 | Bullock |
| 5,371,194 A | 12/1994 | Ferretti |
| 5,387,665 A | 2/1995 | Misawa |
| 5,389,716 A | 2/1995 | Graves |
| 5,393,849 A | 2/1995 | Srinivasan |
| 5,416,139 A | 5/1995 | Zeiszler |
| 5,421,838 A | 6/1995 | Gosset |
| 5,424,418 A | 6/1995 | Duflot |
| 5,434,233 A | 7/1995 | Kiely |
| 5,447,977 A | 9/1995 | Hansen |
| 5,470,843 A | 11/1995 | Stahl |
| 5,480,973 A | 1/1996 | Goodlad |
| 5,492,756 A | 2/1996 | Seale |
| 5,498,662 A | 3/1996 | Tanaka |
| 5,503,920 A | 4/1996 | Alkire |
| 5,534,612 A | 7/1996 | Taylor |
| 5,536,766 A | 7/1996 | Seyffer |
| 5,538,783 A | 7/1996 | Hansen |
| 5,543,215 A | 8/1996 | Hansen |
| 5,545,279 A | 8/1996 | Hall |
| 5,547,541 A | 8/1996 | Hansen |
| 5,547,745 A | 8/1996 | Hansen |
| 5,550,189 A | 8/1996 | Qin |
| 5,554,730 A | 9/1996 | Woiszwillo |
| 5,562,740 A | 10/1996 | Cook |
| 5,571,618 A | 11/1996 | Hansen |
| 5,578,678 A | 11/1996 | Hartmann |
| 5,580,856 A | 12/1996 | Prestrelski |
| 5,582,682 A | 12/1996 | Ferretti |
| 5,583,193 A | 12/1996 | Aravindakshan |
| 5,589,256 A | 12/1996 | Hansen |
| 5,589,536 A | 12/1996 | Golino |
| 5,607,759 A | 3/1997 | Hansen |
| 5,608,011 A | 3/1997 | Eck |
| 5,609,727 A | 3/1997 | Hansen |
| 5,614,570 A | 3/1997 | Hansen |
| 5,620,940 A | 4/1997 | Birbara |
| 5,621,026 A | 4/1997 | Tanaka |
| 5,633,298 A | 5/1997 | Arfaei |
| 5,641,561 A | 6/1997 | Hansen |
| 5,643,978 A | 7/1997 | Darwin |
| 5,645,756 A | 7/1997 | Dubin |
| 5,660,904 A | 8/1997 | Andersen |
| 5,661,213 A | 8/1997 | Arkens |
| 5,670,585 A | 9/1997 | Taylor |
| 5,672,418 A | 9/1997 | Hansen |
| 5,672,659 A | 9/1997 | Shalaby |
| 5,690,715 A | 11/1997 | Schiwek |
| 5,691,060 A | 11/1997 | Levy |
| 5,693,411 A | 12/1997 | Hansen |
| 5,719,092 A | 2/1998 | Arrington |
| 5,719,228 A | 2/1998 | Taylor |
| 5,733,624 A | 3/1998 | Syme |
| 5,756,580 A | 5/1998 | Natori |
| 5,763,524 A | 6/1998 | Arkens |
| 5,788,243 A | 8/1998 | Harshaw |
| 5,788,423 A | 8/1998 | Perkins |
| 5,807,364 A | 9/1998 | Hansen |
| 5,855,987 A | 1/1999 | Margel |
| 5,863,985 A | 1/1999 | Shalaby |
| 5,885,337 A | 3/1999 | Nohr |
| 5,895,804 A | 4/1999 | Lee |
| 5,905,115 A | 5/1999 | Luitjes |
| 5,916,503 A | 6/1999 | Rettenbacher |
| 5,919,528 A | 7/1999 | Huijs |
| 5,919,831 A | 7/1999 | Philipp |
| 5,922,403 A | 7/1999 | Tecle |
| 5,925,722 A | 7/1999 | Exner |
| 5,929,184 A | 7/1999 | Holmes-Farley |
| 5,929,196 A | 7/1999 | Kissel |
| 5,932,344 A | 8/1999 | Ikemoto |
| 5,932,665 A | 8/1999 | Deporter |
| 5,932,689 A | 8/1999 | Arkens |
| 5,942,123 A | 8/1999 | Mcardle |
| 5,954,869 A | 9/1999 | Elfersy |
| 5,977,224 A | 11/1999 | Cheung |
| 5,977,232 A | 11/1999 | Arkens |
| 5,981,719 A | 11/1999 | Woiszwillo |
| 5,983,586 A | 11/1999 | Berdan, II |
| 5,990,216 A | 11/1999 | Cai |
| 5,993,709 A | 11/1999 | Bonomo |
| 6,022,615 A | 2/2000 | Rettenbacher |
| 6,067,821 A | 5/2000 | Jackson |
| 6,071,549 A | 6/2000 | Hansen |
| 6,071,994 A | 6/2000 | Hummerich |
| 6,072,086 A | 6/2000 | James |

(56) References Cited

U.S. PATENT DOCUMENTS

| | | | |
|---|---|---|---|
| 6,077,883 A | 6/2000 | Taylor | |
| 6,090,925 A | 7/2000 | Woiszwillo | |
| 6,114,033 A | 9/2000 | Ikemoto | |
| 6,114,464 A * | 9/2000 | Reck | B27N 3/002 428/375 |
| 6,133,347 A | 10/2000 | Vickers, Jr. | |
| 6,136,916 A | 10/2000 | Arkens | |
| 6,139,619 A | 10/2000 | Zaretskiy | |
| 6,143,243 A | 11/2000 | Gershun | |
| 6,171,444 B1 | 1/2001 | Nigam | |
| 6,171,654 B1 | 1/2001 | Salsman | |
| 6,180,037 B1 | 1/2001 | Anderson | |
| 6,194,512 B1 | 2/2001 | Chen | |
| 6,210,472 B1 | 4/2001 | Kwan | |
| 6,221,958 B1 | 4/2001 | Shalaby | |
| 6,221,973 B1 | 4/2001 | Arkens | |
| 6,231,721 B1 | 5/2001 | Quick | |
| 6,274,661 B1 | 8/2001 | Chen | |
| 6,281,298 B1 | 8/2001 | Papsin, Jr. | |
| 6,299,677 B1 | 10/2001 | Johnson | |
| 6,299,936 B1 | 10/2001 | Reck | |
| 6,307,732 B1 | 10/2001 | Tsubaki | |
| 6,310,227 B1 | 10/2001 | Sarama | |
| 6,313,102 B1 | 11/2001 | Colaco | |
| 6,319,683 B1 | 11/2001 | James | |
| 6,331,350 B1 | 12/2001 | Taylor | |
| 6,331,513 B1 | 12/2001 | Zaid | |
| 6,340,411 B1 | 1/2002 | Hansen | |
| 6,348,530 B1 | 2/2002 | Reck | |
| 6,365,079 B1 | 4/2002 | Winkler | |
| 6,372,077 B1 | 4/2002 | Tecle | |
| 6,379,739 B1 | 4/2002 | Formanek | |
| 6,379,814 B1 | 4/2002 | Dupre | |
| 6,395,856 B1 | 5/2002 | Petty | |
| 6,403,665 B1 | 6/2002 | Sieker | |
| 6,407,225 B1 | 6/2002 | Mang | |
| 6,410,036 B1 | 6/2002 | De Rosa | |
| 6,440,204 B1 | 8/2002 | Rogols | |
| 6,441,122 B1 | 8/2002 | DeMott | |
| 6,461,553 B1 | 10/2002 | Hansen | |
| 6,468,442 B2 | 10/2002 | Bytnar | |
| 6,468,730 B2 | 10/2002 | Fujiwara | |
| 6,469,120 B1 | 10/2002 | Elfersy | |
| 6,475,552 B1 | 11/2002 | Shah | |
| 6,482,875 B2 | 11/2002 | Lorenz | |
| 6,495,656 B1 | 12/2002 | Haile | |
| 6,521,339 B1 | 2/2003 | Hansen | |
| 6,525,009 B2 | 2/2003 | Sachdev | |
| 6,538,057 B1 | 3/2003 | Wildburg | |
| 6,547,867 B2 | 4/2003 | Rogols | |
| 6,555,616 B1 | 4/2003 | Helbing | |
| 6,559,302 B1 | 5/2003 | Shah | |
| 6,562,267 B1 | 5/2003 | Hansen | |
| 6,596,103 B1 | 7/2003 | Hansen | |
| 6,613,378 B1 | 9/2003 | Erhan | |
| 6,638,882 B1 | 10/2003 | Helbing | |
| 6,638,884 B2 | 10/2003 | Quick | |
| 6,699,945 B1 | 3/2004 | Chen | |
| 6,706,853 B1 | 3/2004 | Stanssens | |
| 6,719,862 B2 | 4/2004 | Quick | |
| 6,730,730 B1 | 5/2004 | Hansen | |
| 6,753,361 B2 | 6/2004 | Kroner | |
| 6,818,694 B2 | 11/2004 | Hindi | |
| 6,821,547 B2 | 11/2004 | Shah | |
| 6,852,247 B2 | 2/2005 | Bytnar | |
| 6,858,074 B2 | 2/2005 | Anderson | |
| 6,861,495 B2 | 3/2005 | Barsotti | |
| 6,864,044 B2 | 3/2005 | Ishikawa | |
| 6,878,800 B2 | 4/2005 | Husemoen | |
| 6,884,849 B2 | 4/2005 | Chen | |
| 6,955,844 B2 | 10/2005 | Tagge | |
| 6,962,714 B2 | 11/2005 | Hei | |
| 6,989,171 B2 | 1/2006 | Portman | |
| 6,992,203 B2 | 1/2006 | Trusovs | |
| 7,018,490 B2 | 3/2006 | Hansen | |
| 7,029,717 B1 | 4/2006 | Ojima | |
| 7,067,579 B2 | 6/2006 | Taylor | |
| 7,083,831 B1 | 8/2006 | Koch | |
| 7,090,745 B2 | 8/2006 | Beckman | |
| 7,141,626 B2 | 11/2006 | Rodrigues | |
| 7,144,474 B1 | 12/2006 | Hansen | |
| 7,195,792 B2 | 3/2007 | Boston | |
| 7,201,778 B2 | 4/2007 | Smith | |
| 7,201,825 B2 | 4/2007 | Dezutter | |
| 7,202,326 B2 | 4/2007 | Kuroda | |
| 7,241,487 B2 | 7/2007 | Taylor | |
| 7,458,235 B2 | 12/2008 | Beaufils | |
| 7,514,027 B2 | 4/2009 | Horres | |
| 7,655,711 B2 | 2/2010 | Swift | |
| 7,772,347 B2 | 8/2010 | Swift | |
| 7,795,354 B2 | 9/2010 | Srinivasan | |
| 7,803,879 B2 | 9/2010 | Srinivasan | |
| 7,807,771 B2 | 10/2010 | Swift | |
| 7,842,382 B2 | 11/2010 | Helbing | |
| 7,854,980 B2 | 12/2010 | Jackson | |
| 7,883,693 B2 | 2/2011 | Sehl | |
| 7,888,445 B2 | 2/2011 | Swift | |
| 7,947,765 B2 | 5/2011 | Swift | |
| 8,114,210 B2 | 2/2012 | Hampson | |
| 8,182,648 B2 | 5/2012 | Swift | |
| 8,211,923 B2 | 7/2012 | Wagner | |
| 8,372,900 B2 | 2/2013 | Shooshtari | |
| 8,377,564 B2 | 2/2013 | Shooshtari | |
| 8,501,838 B2 | 8/2013 | Jackson | |
| 8,680,224 B2 | 3/2014 | Zhang | |
| 8,691,934 B2 | 4/2014 | Helbing | |
| 8,900,495 B2 | 12/2014 | Pacorel | |
| 10,508,172 B2 * | 12/2019 | Pacorel | C08G 73/0206 |
| 2001/0017427 A1 | 8/2001 | Rosthauser | |
| 2001/0046824 A1 | 11/2001 | Nigam | |
| 2002/0000100 A1 | 1/2002 | Burg | |
| 2002/0025435 A1 | 2/2002 | Hansen | |
| 2002/0026025 A1 | 2/2002 | Kuo | |
| 2002/0028857 A1 | 3/2002 | Holy | |
| 2002/0032253 A1 | 3/2002 | Lorenz | |
| 2002/0042473 A1 | 4/2002 | Trollsas | |
| 2002/0091185 A1 | 7/2002 | Taylor | |
| 2002/0096278 A1 | 7/2002 | Foster | |
| 2002/0123598 A1 | 9/2002 | Sieker | |
| 2002/0130439 A1 | 9/2002 | Kroner | |
| 2002/0161108 A1 | 10/2002 | Schultz | |
| 2002/0197352 A1 | 12/2002 | Portman | |
| 2003/0005857 A1 | 1/2003 | Minami | |
| 2003/0040239 A1 | 2/2003 | To | |
| 2003/0044513 A1 | 3/2003 | Shah | |
| 2003/0066523 A1 | 4/2003 | Lewis | |
| 2003/0071879 A1 | 4/2003 | Swenson | |
| 2003/0116294 A1 | 6/2003 | Kehrer | |
| 2003/0134945 A1 | 7/2003 | Capps | |
| 2003/0148084 A1 | 8/2003 | Trocino | |
| 2003/0153690 A1 | 8/2003 | Husemoen | |
| 2003/0185991 A1 | 10/2003 | Wigger | |
| 2003/0203117 A1 | 10/2003 | Bartkowiak | |
| 2004/0002567 A1 | 1/2004 | Chen | |
| 2004/0019168 A1 | 1/2004 | Soerens | |
| 2004/0024170 A1 | 2/2004 | Husemoen | |
| 2004/0033269 A1 | 2/2004 | Hei | |
| 2004/0033747 A1 | 2/2004 | Miller | |
| 2004/0034154 A1 | 2/2004 | Tutin | |
| 2004/0038017 A1 | 2/2004 | Tutin | |
| 2004/0048531 A1 | 3/2004 | Belmares | |
| 2004/0077055 A1 | 4/2004 | Fosdick | |
| 2004/0079499 A1 | 4/2004 | Dezutter | |
| 2004/0087024 A1 | 5/2004 | Bellocq | |
| 2004/0087719 A1 | 5/2004 | Rautschek | |
| 2004/0122166 A1 | 6/2004 | O'Brien-Bernini | |
| 2004/0131874 A1 | 7/2004 | Tutin | |
| 2004/0144706 A1 | 7/2004 | Beaufils | |
| 2004/0152824 A1 | 8/2004 | Dobrowolski | |
| 2004/0161993 A1 | 8/2004 | Tripp | |
| 2004/0209851 A1 | 10/2004 | Nelson | |
| 2004/0213930 A1 | 10/2004 | Halabisky | |
| 2004/0220368 A1 | 11/2004 | Li | |
| 2004/0249066 A1 | 12/2004 | Heinzman | |

(56) References Cited

U.S. PATENT DOCUMENTS

| | | |
|---|---|---|
| 2004/0254285 A1 | 12/2004 | Rodrigues |
| 2004/0260082 A1 | 12/2004 | Van |
| 2005/0001198 A1 | 1/2005 | Bytnar |
| 2005/0017394 A1 | 1/2005 | Hochsmann |
| 2005/0027283 A1 | 2/2005 | Richard |
| 2005/0033037 A1 | 2/2005 | Trusovs |
| 2005/0048212 A1 | 3/2005 | Clamen |
| 2005/0059770 A1 | 3/2005 | Srinivasan |
| 2005/0171085 A1 | 8/2005 | Pinto |
| 2005/0196421 A1 | 9/2005 | Hunter |
| 2005/0202224 A1 | 9/2005 | Helbing |
| 2005/0208852 A1 | 9/2005 | Weber |
| 2005/0215153 A1 | 9/2005 | Cossement |
| 2005/0245669 A1 | 11/2005 | Clungeon |
| 2005/0275133 A1 | 12/2005 | Cabell |
| 2005/0288479 A1 | 12/2005 | Kuroda |
| 2006/0005580 A1 | 1/2006 | Espiard |
| 2006/0009569 A1 | 1/2006 | Charbonneau |
| 2006/0044302 A1 | 3/2006 | Chen |
| 2006/0099870 A1 | 5/2006 | Garcia |
| 2006/0111480 A1 | 5/2006 | Hansen |
| 2006/0124538 A1 | 6/2006 | Morcrette |
| 2006/0135433 A1 | 6/2006 | Murray |
| 2006/0141177 A1 | 6/2006 | Ligtenberg |
| 2006/0179892 A1 | 8/2006 | Horres |
| 2006/0188465 A1 | 8/2006 | Perrier |
| 2006/0198954 A1 | 9/2006 | Frechem |
| 2006/0231487 A1 | 10/2006 | Bartley |
| 2006/0252855 A1 | 11/2006 | Pisanova |
| 2006/0281622 A1 | 12/2006 | Maricourt |
| 2007/0006390 A1 | 1/2007 | Clamen |
| 2007/0009582 A1 | 1/2007 | Madsen |
| 2007/0027281 A1 | 2/2007 | Michl |
| 2007/0039520 A1 | 2/2007 | Crews |
| 2007/0082983 A1 | 4/2007 | Crews |
| 2007/0123679 A1 | 5/2007 | Swift |
| 2007/0123680 A1 | 5/2007 | Swift |
| 2007/0129522 A1 | 6/2007 | Burckhardt |
| 2007/0142596 A1 | 6/2007 | Swift |
| 2007/0158022 A1 | 7/2007 | Heep |
| 2007/0184740 A1 | 8/2007 | Keller |
| 2007/0191574 A1 | 8/2007 | Miller |
| 2007/0270070 A1 | 11/2007 | Hamed |
| 2007/0287018 A1 | 12/2007 | Tutin |
| 2007/0292618 A1 | 12/2007 | Srinivasan |
| 2007/0292619 A1 | 12/2007 | Srinivasan |
| 2007/0298274 A1 | 12/2007 | Eriksson |
| 2008/0009209 A1 | 1/2008 | Clamen |
| 2008/0009616 A1 | 1/2008 | Frank |
| 2008/0051539 A1 | 2/2008 | Kelly |
| 2008/0060551 A1 | 3/2008 | Crews |
| 2008/0081138 A1 | 4/2008 | Moore |
| 2008/0108741 A1 | 5/2008 | Van Herwijnen |
| 2008/0160260 A1 | 7/2008 | Wada |
| 2008/0160302 A1 | 7/2008 | Asrar |
| 2008/0194738 A1 | 8/2008 | Crews |
| 2009/0169867 A1 | 7/2009 | Kelly |
| 2009/0170978 A1 | 7/2009 | Kelly |
| 2009/0227732 A1 | 9/2009 | Glockner |
| 2009/0301972 A1 | 12/2009 | Hines |
| 2009/0304919 A1 | 12/2009 | Wagner |
| 2009/0306255 A1 | 12/2009 | Patel |
| 2009/0324915 A1 | 12/2009 | Swift |
| 2010/0029160 A1 | 2/2010 | Srinivasan |
| 2010/0058661 A1 | 3/2010 | Jackson |
| 2010/0080976 A1 | 4/2010 | Jackson |
| 2010/0084598 A1 | 4/2010 | Jackson |
| 2010/0086726 A1 | 4/2010 | Jackson |
| 2010/0087571 A1 | 4/2010 | Jackson |
| 2010/0098947 A1 | 4/2010 | Inoue |
| 2010/0117023 A1 | 5/2010 | Dopico |
| 2010/0129640 A1 | 5/2010 | Kelly |
| 2010/0130649 A1 | 5/2010 | Swift |
| 2010/0175826 A1 | 7/2010 | Huenig |
| 2010/0210595 A1 | 8/2010 | Wagner |
| 2010/0222463 A1 | 9/2010 | Brady |
| 2010/0222566 A1 | 9/2010 | Fosdick |
| 2010/0282996 A1 | 11/2010 | Jaffrennou |
| 2010/0301256 A1 | 12/2010 | Hampson |
| 2010/0320113 A1 | 12/2010 | Swift |
| 2011/0021672 A1 | 1/2011 | Crews |
| 2011/0039111 A1 | 2/2011 | Shooshtari |
| 2011/0040010 A1 | 2/2011 | Shooshtari |
| 2011/0042303 A1 | 2/2011 | Shooshtari |
| 2011/0045966 A1 | 2/2011 | Shooshtari |
| 2011/0089074 A1 | 4/2011 | Jackson |
| 2011/0135937 A1 | 6/2011 | Swift |
| 2011/0190425 A1 | 8/2011 | Swift |
| 2011/0220835 A1 | 9/2011 | Swift |
| 2011/0256790 A1 | 10/2011 | Toas |
| 2011/0260094 A1 | 10/2011 | Hampson |
| 2011/0262648 A1 | 10/2011 | Lee |
| 2011/0263757 A1 | 10/2011 | Be |
| 2011/0306726 A1 | 12/2011 | Bailey |
| 2012/0133073 A1 | 5/2012 | Pacorel |
| 2012/0156954 A1 | 6/2012 | Eckert |
| 2013/0029150 A1 | 1/2013 | Appley |
| 2013/0032749 A1 | 2/2013 | Jaffrennou |
| 2013/0047888 A1 | 2/2013 | Mueller |
| 2013/0059075 A1 | 3/2013 | Appley |
| 2013/0082205 A1 | 4/2013 | Mueller |
| 2013/0174758 A1 | 7/2013 | Mueller |
| 2013/0234362 A1 | 9/2013 | Swift |
| 2013/0236650 A1 | 9/2013 | Swift |
| 2013/0237113 A1 | 9/2013 | Swift |
| 2013/0244524 A1 | 9/2013 | Swift |
| 2014/0091247 A1 | 4/2014 | Jackson |
| 2014/0134909 A1 | 5/2014 | Guo |
| 2014/0357787 A1 | 12/2014 | Jobber |

FOREIGN PATENT DOCUMENTS

| | | | |
|---|---|---|---|
| CA | 2458333 | 12/1999 | |
| CA | 2278946 | 1/2000 | |
| CA | 2470783 | 12/2004 | |
| DE | 1905054 | 8/1969 | |
| DE | 4308089 | 9/1994 | |
| EP | 0044614 A2 | 1/1982 | |
| EP | 354023 | 2/1990 | |
| EP | 0524518 A2 | 1/1993 | |
| EP | 0547819 A2 | 6/1993 | |
| EP | 0583086 A1 | 2/1994 | |
| EP | 0714754 A2 | 6/1996 | |
| EP | 796681 | 9/1997 | |
| EP | 0826710 A2 | 3/1998 | |
| EP | 856494 | 8/1998 | |
| EP | 0873976 A1 | 10/1998 | |
| EP | 0882756 A2 | 12/1998 | |
| EP | 0911361 A1 | 4/1999 | |
| EP | 915811 | 5/1999 | |
| EP | 936060 | 8/1999 | |
| EP | 0990729 A1 | 4/2000 | |
| EP | 1193288 A1 | 4/2002 | |
| EP | 1084167 | 9/2002 | |
| EP | 1268702 | 1/2003 | |
| EP | 1382642 | 1/2004 | |
| EP | 1486547 A2 | 12/2004 | |
| EP | 1698598 A1 | 9/2006 | |
| EP | 1767566 | 4/2007 | |
| EP | 2223941 | 9/2010 | |
| EP | 2386605 A1 * | 11/2011 | ............ C09J 179/02 |
| GB | 770561 | 3/1957 | |
| GB | 809675 | 3/1959 | |
| GB | 926749 | 5/1963 | |
| GB | 1391172 | 4/1975 | |
| GB | 1469331 | 4/1977 | |
| GB | 1512066 | 5/1978 | |
| GB | 1525541 | 9/1978 | |
| GB | 2047258 | 11/1980 | |
| GB | 2078805 A | 1/1982 | |
| GB | 2173523 | 10/1986 | |
| GB | 2251438 | 7/1992 | |
| NZ | 549563 | 1/2008 | |
| WO | 1990007541 | 7/1990 | |

(56) References Cited

FOREIGN PATENT DOCUMENTS

| | | |
|---|---|---|
| WO | 1992012198 | 7/1992 |
| WO | 1995034517 | 12/1995 |
| WO | 1997049646 | 12/1997 |
| WO | 1999036368 | 7/1999 |
| WO | 199947765 | 9/1999 |
| WO | 199960042 | 11/1999 |
| WO | 199960043 | 11/1999 |
| WO | 200058085 | 10/2000 |
| WO | 2001014491 | 3/2001 |
| WO | 2001059026 | 8/2001 |
| WO | 200200429 | 1/2002 |
| WO | 200206178 | 1/2002 |
| WO | 2003029496 | 4/2003 |
| WO | 2003071879 | 9/2003 |
| WO | 2003106561 | 12/2003 |
| WO | 2004007615 | 1/2004 |
| WO | 2004076734 | 9/2004 |
| WO | 2005087837 | 9/2005 |
| WO | 2006044302 | 4/2006 |
| WO | 2006136614 | 12/2006 |
| WO | 2007014236 | 2/2007 |
| WO | 2007024020 A1 | 3/2007 |
| WO | 2007050964 | 5/2007 |
| WO | 2007112335 | 10/2007 |
| WO | 2008089847 | 7/2008 |
| WO | 2008089851 | 7/2008 |
| WO | 2008141201 | 11/2008 |
| WO | 2009019235 | 2/2009 |
| WO | 2009129084 | 10/2009 |
| WO | 2010027937 | 3/2010 |
| WO | 2010139899 | 12/2010 |
| WO | 2011019590 | 2/2011 |
| WO | 2011019593 | 2/2011 |
| WO | 2011019597 | 2/2011 |
| WO | 2011019598 | 2/2011 |
| WO | 2011022224 | 2/2011 |
| WO | 2011022226 | 2/2011 |
| WO | 2011022227 | 2/2011 |
| WO | 2011138458 | 11/2011 |
| WO | 2011138459 | 11/2011 |
| WO | 2013150123 | 10/2013 |

OTHER PUBLICATIONS

International Search Report and Written Opinion for PCT/US2008/069046, completed Sep. 25, 2008.
International Search Report and Written Opinion for PCT/EP2011/059317, completed Jul. 15, 2011.
International Search Report for PCT/EP2008/060185, completed Oct. 23, 2008.
International Search Report for PCT/EP2011/057363, completed Sep. 5, 2011.
Ames, J.M., "The Maillard Browning Reaction—an Update, "Chemistry & Industry, No. 17, 1988, 4 pages.
"Gamma-aminopropyltrimethoxysilane, "Hawley's Condensed Chemical Dictionary, 14th Edition, John Wiley & Sons, Inc., 2002, 1 page.
Hodge, J.E., Chemistry of Browning Reactions in Model Systems, 1953, J. Agric. Food Chem., vol. 1, No. 15, pp. 928-943.
Agyei-Aye et al., "The Role of Anion in the Reaction of Reducing Sugars with Ammonium Salts," Carbohydrate Research 2002, 337: 2273-2277.
Laroque et al., "Kinetic study on the Maillard reaction. Consideration of sugar reactivity," Food Chemistry 2008, 111: 1032-1042.
Bjorksten et al., "Polyester Resin—Glass Fiber Laminates," Industrial and Engineering Chemistry (1954).
Dow Corning, "A Guide to Silane Solutions," 2005.
Knauf Data Sheet, 2006.
Molasses Corporation, United States Sugar Corporation, http://www.suga-lik.com/molasses/composition.html (Sep. 29, 2003).
Clamen, Guy, "Acrylic Thermosets: A Safe Alternative to Formaldehyde Resins," Nonwovens World, Apr.-May 2004, pp. 96-102.
Opposition to AU 2006272595, Amended Statement of Grounds and Particulars, issued from Australian Patent Office, Jul. 6, 2012, 22 pages.
Decision re Opposition to AU 2006272595, issued from Australian Patent Office, Aug. 14, 2015, 25 pages.
Opposition to EP 1732968, Notice of Opposition: Prior Art, Scope of the Patent, Reasons for the Opposition, issued from European Patent Office, Mar. 8, 2012, 18 pages.
Decision re Opposition to EP 1732968, issued from the European Patent Office, Nov. 14, 2014, 5 pages.
Opposition to EA 019802, submitted to Eurasian Patent Office on Dec. 26, 2014, 36 pages.
Decision re Opposition to EA 019802, issued by Eurasian Patent Office on Aug. 18, 2015, 15 pages.
Owens Corning Retiree Update: What Goes Around, Comes Around: A tale of Natural Binders, revised Mar. 20, 2013 p. 4.
A.P. Bryant, "The Terminology of Sugars," Industrial and Engineering Chemistry, vol. 26, No. 2, p. 231, Feb. 1934.
Food Flavor Chemistry, p. 162, Mar. 21, 2009 (English Abstract).
Office action for co-pending U.S. Appl. No. 15/702,087 (5 pages)—dated Nov. 9, 2018.
Office action for co-pending U.S. Appl. No. 15/177,442 (17 pages)—dated May 19, 2017.
Office action for co-pending U.S. Appl. No. 15/378,159 (18 pages)—dated Mar. 2, 2017.
Office action for co-pending U.S. Appl. No. 15/222,122 (8 pages)—dated Nov. 20, 2017.
Office action for co-pending U.S. Appl. No. 15/310,837 (13 pages)—dated Jun. 21, 2018.
Office action for co-pending U.S. Appl. No. 15/411,972 (9 pages)—dated Mar. 28, 2017.
Office action for co-pending U.S. Appl. No. 15/411,972 (8 pages)—dated Nov. 29, 2017.
Office action for co-pending U.S. Appl. No. 15/411,972 (9 pages)—dated Jun. 14, 2018.
Office action for co-pending U.S. Appl. No. 15/116,254 (8 pages)—dated Apr. 26, 2018.
Office action for co-pending U.S. Appl. No. 15/116,254 (10 pages)—dated Aug. 15, 2018.
Office action for co-pending U.S. Appl. No. 15/333,670 (5 pages)—dated Dec. 8, 2017.
Office Action for co-pending U.S. Appl. No. 14/116,048 (10 pages)—dated Jun. 23, 2017.
Office action for co-pending U.S. Appl. No. 15/959,131 (8 pages)—dated Nov. 8, 2019.
Office action for co-pending U.S. Appl. No. 15/822,102 (6 pages)—dated Dec. 6, 2019.
Office action for co-pending U.S. Appl. No. 15/690,623 (6 pages)—dated Jan. 9, 2020.
Other Information—Narrative of verbal disclosure of Brian Swift (1 page.)—May 13, 2014.
Petition for Inter Partes Review of U.S. Pat. No. 8,114,210 (52 pages, filed Jun. 12, 2015 by Petitioners Johns Manville Corporation and Johns Manville, Inc.).
Declaration of Dr. Frederick J. Hirsekorn Regarding U.S. Pat. No. 8,114,210 (58 pages, filed Jun. 12, 2015 by Petitioners Johns Manville Corporation and Johns Manville, Inc. in connection with Petition for Inter Partes Review of U.S. Pat. No. 8,114,210).
1st Petition for Inter Partes Review of U.S. Pat. No. D631,670 (68 pages, filed Jun. 19, 2015 by Petitioners Johns Manville Corporation and Johns Manville, Inc.).
2nd Petition for Inter Partes Review of U.S. Pat. No. D631,670 (62 pages, filed Nov. 2, 2015 by Petitioners Johns Manville Corporation and Johns Manville, Inc.).
Decision of PTAB regarding Institution of Inter Partes Review for U.S. Pat. No. D631,670 (33 pages)—Jan. 12, 2016.
Decision2 of PTAB regarding Institution of Inter Partes Review for U.S. Pat. No. D631,670 (27 pages)—May 9, 2016.
Final Written Decision of PTAB regarding Inter Partes Review of D631,670 based on 1st Petition (56 pages)—Jan. 11, 2017.
Final Written Decision of PTAB regarding Inter Partes Review of D631,670 based on 2nd Petition (55 pages)—May 8, 2017.

(56) References Cited

OTHER PUBLICATIONS

Court of Appeals for Federal Circuit Judgment from Appeal of PTAB Decisions in Inter Partes Reviews of U.S. Pat. No. D631,670 (2 pages)—Jul. 13, 2018.
1st Petition for Inter Partes Review of U.S. Pat. No. 8,940,089 (61 pages, filed Jul. 1, 2015 by Petitioners Johns Manville Corporation and Johns Manville, Inc.).
Declaration of Dr. Frederick J. Hirsekorn Regarding U.S. Pat. No. 8,940,089 (70 pages, filed Jul. 1, 2015 by Petitioners Johns Manville Corporation and Johns Manville, Inc. in connection with 1st Petition for Inter Partes Review of U.S. Pat. No. 8,940,089).
2nd Petition for Inter Partes Review of U.S. Pat. No. 8,940,089 (56 pages, filed Jul. 10, 2015 by Petitioners Johns Manville Corporation and Johns Manville, Inc.).
Declaration of Dr. Frederick J. Hirsekorn Regarding U.S. Pat. No. 8,940,089 (67 pages, filed Jul. 10, 2015 by Petitioners Johns Manville Corporation and Johns Manville, Inc. in connection with 2nd Petition for Inter Partes Review of U.S. Pat. No. 8,940,089).
3rd Petition for Inter Partes Review of U.S. Pat. No. 8,940,089 (62 pages, filed Jul. 17, 2015 by Petitioners Johns Manville Corporation and Johns Manville, Inc.).
Declaration of Dr. Frederick J. Hirsekorn Regarding U.S. Pat. No. 8,940,089 (76 pages, filed Jul. 17, 2015 by Petitioners Johns Manville Corporation and Johns Manville, Inc. in connection with 3rd Petition for Inter Partes Review of U.S. Pat. No. 8,940,089).
Declaration of Dr. Elam Leed (11 pages, filed Jul. 1, Jul. 10, and Jul. 17, 2015 by Petitioners Johns Manville Corporation and Johns Manville, Inc. in connection with 1st, 2nd and 3rd Petition for Inter Partes Review of U.S. Pat. No. 8,940,089, respectively).
Declaration of Dr. Jonathan Vickers (10 pages, filed Jul. 1, Jul. 10, and Jul. 17, 2015 by Petitioners Johns Manville Corporation and Johns Manville, Inc. in connection with 1st, 2nd and 3rd Petition for Inter Partes Review of U.S. Pat. No. 8,940,089, respectively).
1st Petition for Inter Partes Review of U.S. Pat. No. 9,039,827 (60 pages, filed Jul. 29, 2015 by Petitioners Johns Manville Corporation and Johns Manville, Inc.).
Declaration of Dr. Frederick J. Hirsekorn Regarding U.S. Pat. No. 9,039,827 (72 pages, filed Jul. 29, 2015 by Petitioners Johns Manville Corporation and Johns Manville, Inc. in connection with $1^{st}$ Petition for Inter Partes Review of U.S. Pat. No. 9,039,827).
2nd Petition for Inter Partes Review of U.S. Pat. No. 9,039,827 (51 pages, filed Aug. 5, 2015 by Petitioners Johns Manville Corporation and Johns Manville, Inc.).
Declaration of Dr. Frederick J. Hirsekorn Regarding U.S. Pat. No. 9,039,827 (65 pages, filed Aug. 5, 2015 by Petitioners Johns Manville Corporation and Johns Manville, Inc. in connection with $2^{nd}$ Petition for Inter Partes Review of U.S. Pat. No. 9,039,827).
3rd Petition for Inter Partes Review of U.S. Pat. No. 9,039,827 (57 pp., filed Aug. 7, 2015 by Petitioners Johns Manville Corporation and Johns Manville, Inc.).
Declaration of Dr. Frederick J. Hirsekorn Regarding U.S. Pat. No. 9,039,827 (75 pages, filed Aug. 7, 2015 by Petitioners Johns Manville Corporation and Johns Manville, Inc. in connection with $3^{rd}$ Petitioni for Inter Partes Review of U.S. Pat. No. 9,039,827).
Declaration of Dr. Elam Leed (11 pages, filed Jul. 29, Aug. 5, and Aug. 7, 2015 by Petitioners Johns Manville Corporation and Johns Manville, Inc. in connection with 1st, 2nd and 3rd Petition for Inter Partes Review of U.S. Pat. No. 9,039,827, respectively).
Declaration of Dr. Jonathan Vickers (10 pages, filed Jul. 29, Aug. 5, and Aug. 7, 2015 by Petitioners Johns Manville Corporation and Johns Manville, Inc. in connection with 1st, 2nd and 3rd Petition for Inter Partes Review of U.S. Pat. No. 9,039,827, respectively).
Petition for Inter Partes Review of U.S. Pat. No. 9,469,747 (67 pages, filed Mar. 20, 2018 by Petitioners Johns Manville Corporation and Johns Manville, Inc.).
Petition for Inter Partes Review of U.S. Pat. No. 9,828,287 (86 pages, filed Mar. 23, 2018 by Petitioners Johns Manville Corporation and Johns Manville, Inc.).
Petition for Inter Partes Review of U.S. Pat. No. 9,464,207 (78 pages, filed Mar. 28, 2018 by Petitioners Johns Manville Corporation and Johns Manville, Inc.).
Petition for Inter Partes Review of U.S. Pat. No. 9,926,464 (74 pages, filed Mar. 30, 2018 by Petitioners Johns Manville Corporation and Johns Manville, Inc.).
Office Action Granting Ex Parte Reexamination of U.S. Pat. No. 7,888,445, dated Dec. 24, 2013, in Control No. 90/013,029, 11 pages.
Office Action Granting Ex Parte Reexamination of U.S. Pat. No. 7,772,347, dated Dec. 24, 2013, in Control No. 90/013,030, 14 pages.
Office Action Granting Ex Parte Reexamination of U.S. Pat. No. 7,854,980, dated Apr. 15, 2014, in Control No. 90/013,156, 20 pages.
Declaration of Jan Rud Andersen submitted in Ex parte Reexamination Control No. 90/013,030, as Document OTH-C, Oct. 10, 2013, 4 pages.
Final Rejection in Ex Parte Reexamination of U.S. Pat. No. 7,888,445 (20 pages)—dated Jul. 24, 2015.
Final Rejection in Ex Parte Reexamination of U.S. Pat. No. 7,772,347 (23 pages)—dated Jul. 24, 2015.
Final Rejection in Ex Parte Reexamination of U.S. Pat. No. 7,854,980 (31 pages)—dated Aug. 18, 2015.
Advisory Action in Ex Parte Reexamination of U.S. Pat. No. 7,888,445 (4 pages)—dated Oct. 6, 2015.
Advisory Action in Ex Parte Reexamination of U.S. Pat. No. 7,772,347 (4 pages)—dated Oct. 6, 2015.
Advisory Action in Ex Parte Reexamination of U.S. Pat. No. 7,854,980 (4 pages)—dated Nov. 18, 2015.
Examiner's Answer in Ex Parte Reexamination of U.S. Pat. No. 7,888,445 (8 pages)—Mar. 23, 2016.
Examiner's Answer in Ex Parte Reexamination of U.S. Pat. No. 7,772,347 (8 pages)—Mar. 23, 2016.
Examiner's Answer in Ex Parte Reexamination of U.S. Pat. No. 7,854,980 (8 pages)—Mar. 22, 2016.
Decision of PTAB in Ex Parte Reexamination of U.S. Pat. No. 7,888,445 (17 pages)—Sep. 29, 2016.
Decision of PTAB in Ex Parte Reexamination of U.S. Pat. No. 7,772,347 (18 pages)—Sep. 29, 2016.
Decision of PTAB in Ex Parte Reexamination of U.S. Pat. No. 7,854,980 (22 pages)—Sep. 30, 2016.
Court of Appeals for Federal Circuit Judgment from Consolidated Appeal of PTAB Decisions in Ex Parte Reexamination of U.S. Pat. No. 7,888,445, U.S. Pat. No. 7,772,347 and U.S. Pat. No. 7,854,980 (5 pages)—Mar. 9, 2018.
Notice of Intent to Issue Ex Parte Reexamination Certificate for U.S. Pat. No. 7,772,347 (4 pages)—dated Oct. 24, 2018.
Notice of Intent to Issue Ex Parte Reexamination Certificate for U.S. Pat. No. 7,888,445 (4 pages)—dated Dec. 7, 2018.
Decision of USPTO to Reopen Prosecution in Ex Parte Reexamination of U.S. Pat. No. 7,854,980 (7 pages)—Jan. 7, 2019.
Notice of Intent to Issue Inter Partes Reexamination Certificate for U.S. Pat. No. 7,807,771 (4 pages)—dated Jan. 30, 2014.
Notice of Intent to Issue Inter Partes Reexamination Certificate for U.S. Pat. No. 7,854,980 (6 pages)—dated Aug. 31, 2017.
Decision of PTAB in Inter Partes Reexamination of U.S. Pat. No. 7,772,347 (36 pages)—May 1, 2015.
Decision of PTAB in Inter Partes Reexamination of U.S. Pat. No. 7,854,980 (25 pages)—Jul. 30, 2015.
Remand Order of PTAB in Inter Partes Reexamination of U.S. Pat. No. 7,888,445 (5 pages)—Dec. 9, 2015.
Remand Order of PTAB in Inter Partes Reexamination of U.S. Pat. No. 7,772,347 (5 pages)—Dec. 9, 2015.
Examiner's Determination on Patent Owner Response/Requester Comments after Board Decision in Inter Partes Reexamination of U.S. Pat. No. 7,888,445 (22 pages)—Oct. 17, 2016.
Examiner's Determination on Patent Owner Response/Requester Comments after Board Decision in Inter Partes Reexamination of U.S. Pat. No. 7,772,347 (17 pages)—Oct. 17, 2016.
Court of Appeals for Federal Circuit Opinion/Judgment from Appeal of PTAB Decision in Inter Partes Reexamination of U.S. Pat. No. 7,854,980 (13 pages)—Feb. 27, 2017.

(56) References Cited

OTHER PUBLICATIONS

Final Decision of PTAB in Inter Partes Reexamination of U.S. Pat. No. 7,888,445 (25 pages)—Sep. 8, 2017.
Final Decision of PTAB in Inter Partes Reexamination of U.S. Pat. No. 7,772,347 (24 pages)—Sep. 8, 2017.
Decision of PTAB re Request for Rehearing in Inter Partes Reexamination of U.S. Pat. No. 7,888,445 (7 pages)—Feb. 12, 2018.
Decision of PTAB re Request for Rehearing in Inter Partes Reexamination of U.S. Pat. No. 7,772,347 (7 pages)—Feb. 12, 2018.
Decision of PTAB regarding Institution of Inter Partes Review for U.S. Pat. No. 8,114,210 (20 pages)—Oct. 21, 2015.
Final Written Decision of PTAB regarding Inter Partes Review of U.S. Pat. No. 8,114,210 (39 pages)—Oct. 19, 2016.
Court of Appeals for Federal Circuit Judgment from Appeal of PTAB Decision in Inter Partes Review of U.S. Pat. No. 8,114,210 (5 pages)—Jan. 16, 2018.
Decision1 of PTAB declining Institution of Inter Partes Review for U.S. Pat. No. 8,940,089 (16 pages)—Dec. 17, 2015.
Decision2 of PTAB declining Institution of Inter Partes Review for U.S. Pat. No. 8,940,089 (19 pages)—Dec. 17, 2015.
Decision3 of PTAB declining Institution of Inter Partes Review for U.S. Pat. No. 8,940,089 (14 pages)—Dec. 17, 2015.
Decision1 of PTAB declining Institution of Inter Partes Review for U.S. Pat. No. 9,039,827 (16 pages)—Jan. 4, 2016.
Decision2 of PTAB declining Institution of Inter Partes Review for U.S. Pat. No. 9,039,827 (19 pages)—Jan. 4, 2016.
Decision3 of PTAB declining Institution of Inter Partes Review for U.S. Pat. No. 9,039,827 (14 pages)—Jan. 4, 2016.
Decision of PTAB denying Institution of Inter Partes Review for U.S. Pat. No. 9,926,464 (29 pages)—Oct. 2, 2018.
Decision of PTAB denying Institution of Inter Partes Review for U.S. Pat. No. 9,464,207 (28 pages)—Oct. 2, 2018.
Decision of PTAB denying Institution of Inter Partes Review for U.S. Pat. No. 9,469,747 (29 pages)—Oct. 3, 2018.
Decision of PTAB denying Institution of Inter Partes Review for U.S. Pat. No. 9,828,287 (22 pages)—Oct. 16, 2018.
Statement of Revocation Grounds re GB2496951—Claimant Rockwool International (May 21, 2018, 22 pages).
Statement of Revocation Grounds re GB2451719—Claimant Rockwool International (May 18, 2018, 22 Pages).
Expert Report re Revocation of GB2451719 and GB2496951—Claimant Rockwool International (Nov. 12, 2018, 11 pages).
File Wrapper re U.S. Pat. No. 2,965,504—Part 1 (10 pages).
File Wrapper re U.S. Pat. No. 2,965,504—Part 2 (14 pages).
File Wrapper re U.S. Pat. No. 2,965,504—Part 3 (14 pages).
Gogek Attorney Comments re U.S. Pat. No. 2,965,504—Apr. 6, 1960 (3 pages).
Gogek Affidavit Under Rule 132 re U.S. Pat. No. 2,965,504—Feb. 26, 1960 (3 pages).
Notice of Intent to Issue Ex Parte Reexamination Certificate for U.S. Pat. No. 8,114,210 (4 pages)—dated May 27, 2021.
Notice of Intent to Issue Ex Parte Reexamination Certificate for U.S. Pat. No. 9,464,207 (4 pages)—dated Apr. 19, 2021.
Notice of Intent to Issue Ex Parte Reexamination Certificate for U.S. Pat. No. 9,828,287 (5 pages)—dated May 5, 2021.
Notice of Intent to Issue Ex Parte Reexamination Certificate for U.S. Pat. No. 9,926,464 (5 pages)—dated May 5, 2021.
Notice of Intent to Issue Ex Parte Reexamination Certificate for U.S. Pat. No. 9,469,747 (8 pages)—dated May 21, 2021.
Notice of Intent to Issue Ex Parte Reexamination Certificate for U.S. Pat. No. 9,039,827 (3 pages)—dated Jul. 2, 2021.
Notice of Intent to Issue Ex Parte Reexamination Certificate for U.S. Pat. No. 8,940,089 (4 pages)—dated Jul. 13, 2021.
Viswanathan, T., and Richardson, T., "Thermosetting Adhesive Resins from Whey and Whey Byproducts," Ind. Eng. Chem. Prod. Res. Dev. 23:644-47, American Chemical Society, United States (1984).
Office action for co-pending U.S. Appl. No. 12/524,502 (9 pages)—dated Sep. 21, 2012.
Office action for co-pending U.S. Appl. No. 12/524,502 (9 pages)—dated Apr. 4, 2013.
Office action for co-pending U.S. Appl. No. 12/524,512 (7 pages)—dated Aug. 6, 2012.
Office action for co-pending U.S. Appl. No. 12/524,512 (9 pages)—dated Apr. 1, 2013.
Office action for co-pending U.S. Appl. No. 12/524,512 (14 pages)—dated Nov. 12, 2014.
Office action for co-pending U.S. Appl. No. 12/524,512 (9 pages)—dated Jul. 10, 2015.
Office action for co-pending U.S. Appl. No. 12/524,512 (10 pages)—dated Mar. 23, 2016.
Office action for co-pending U.S. Appl. No. 12/524,512 (13 pages)—dated Oct. 5, 2016.
Office action for co-pending U.S. Appl. No. 12/524,512 (13 pages)—dated Apr. 6, 2018.
Office action for co-pending U.S. Appl. No. 12/524,512 (15 pages)—dated Jan. 17, 2019.
Office action for co-pending U.S. Appl. No. 12/524,469 (7 pages)—dated Jun. 7, 2012.
Office action for co-pending U.S. Appl. No. 12/524,469 (8 pages)—dated Jan. 29, 2013.
Office action for co-pending U.S. Appl. No. 12/524,469 (7 pages)—dated Aug. 20, 2013.
Office action for co-pending U.S. Appl. No. 12/524,469 (9 pages)—dated Jun. 9, 2014.
Office action for co-pending U.S. Appl. No. 12/524,469 (9 pages)—dated Oct. 17, 2014.
Office action for co-pending U.S. Appl. No. 12/524,469 (9 pages)—dated Jul. 23, 2015.
Office action for co-pending U.S. Appl. No. 12/524,539 (13 pages)—dated Jun. 21, 2012.
Office action for co-pending U.S. Appl. No. 12/524,539 (13 pages)—dated Jun. 6, 2013.
Office action for co-pending U.S. Appl. No. 12/524,539 (12 pages)—dated Dec. 17, 2014.
Office action for co-pending U.S. Appl. No. 12/524,539 (7 pages)—dated Jul. 15, 2015.
Office action for co-pending U.S. Appl. No. 12/524,539 (7 pages)—dated Mar. 23, 2016.
Office action for co-pending U.S. Appl. No. 12/524,539 (7 pages)—dated Dec. 29, 2016.
Office action for co-pending U.S. Appl. No. 12/524,522 (4 pages)—dated Oct. 11, 2011.
Office action for co-pending U.S. Appl. No. 12/667,718 (5 pages)—dated Sep. 3, 2013.
Office action for co-pending U.S. Appl. No. 12/667,718 (6 pages)—dated Sep. 9, 2014.
Office action for co-pending U.S. Appl. No. 12/671,922 (10 pages)—dated Oct. 7, 2011.
Office action for co-pending U.S. Appl. No. 12/671,922 (10 pages)—dated May 10, 2012.
Office action for co-pending U.S. Appl. No. 12/671,922 (9 pages)—dated Sep. 23, 2014.
Office action for co-pending U.S. Appl. No. 12/671,922 (5 pages)—dated Apr. 4, 2016.
Office action for co-pending U.S. Appl. No. 13/388,408 (5 pages)—dated Aug. 15, 2013.
Office action for co-pending U.S. Appl. No. 13/371,829 (9 pages)—dated Dec. 20, 2012.
Office action for co-pending U.S. Appl. No. 13/371,829 (6 pages)—dated Jul. 12, 2013.
Office action for co-pending U.S. Appl. No. 13/371,829 (6 pages)—dated Aug. 12, 2014.
Office action for co-pending U.S. Appl. No. 13/637,794 (8 pages)—dated Aug. 12, 2013.
Office action for co-pending U.S. Appl. No. 13/637,794 (9 pages)—dated Mar. 26, 2014.
Office action for co-pending U.S. Appl. No. 13/696,439 (11 pages)—dated Jan. 8, 2014.
Office action for co-pending U.S. Appl. No. 13/696,452 (7 pages)—dated Jan. 13, 2015.

(56) References Cited

OTHER PUBLICATIONS

Office action for co-pending U.S. Appl. No. 13/696,452 (9 pages)—dated Oct. 27, 2015.
Office action for co-pending U.S. Appl. No. 13/702,144 (6 pages)—dated Jan. 10, 2014.
Office action for co-pending U.S. Appl. No. 13/702,144 (7 pages)—dated Jul. 29, 2014.
Office action for co-pending U.S. Appl. No. 13/823,818 (9 pages)—dated Mar. 26, 2015.
Office action for co-pending U.S. Appl. No. 13/866,368 (16 pages)—dated Aug. 29, 2013.
Office action for co-pending U.S. Appl. No. 13/866,368 (11 pages)—dated Apr. 16, 2014.
Office action for co-pending U.S. Appl. No. 13/866,368 (8 pages)—dated Aug. 21, 2014.
Office action for co-pending U.S. Appl. No. 13/866,419 (14 pages)—dated Sep. 20, 2013.
Office action for co-pending U.S. Appl. No. 13/866,419 (10 pages)—dated Apr. 25, 2014.
Office action for co-pending U.S. Appl. No. 13/866,419 (8 pages)—dated Oct. 9, 2014.
Office action for co-pending U.S. Appl. No. 13/866,419 (8 pages)—dated Sep. 25, 2015.
Office action for co-pending U.S. Appl. No. 13/868,233 (23 pages)—dated Aug. 13, 2013.
Office action for co-pending U.S. Appl. No. 13/868,233 (12 pages)—dated Apr. 15, 2014.
Office action for co-pending U.S. Appl. No. 13/868,233 (8 pages)—dated Oct. 7, 2014.
Office action for co-pending U.S. Appl. No. 13/868,233 (8 pages)—dated Jul. 16, 2015.
Office action for co-pending U.S. Appl. No. 13/868,238 (8 pages)—dated Jul. 16, 2014.
Office action for co-pending U.S. Appl. No. 12/976,379 (7 pages)—dated Jan. 10, 2012.
Office action for co-pending U.S. Appl. No. 12/976,379 (6 pages)—dated Jul. 27, 2012.
Office action for co-pending U.S. Appl. No. 12/976,379 (9 pages)—dated Mar. 7, 2013.
Office action for co-pending U.S. Appl. No. 12/976,379 (8 pages)—dated Aug. 20, 2013.
Office action for co-pending U.S. Appl. No. 12/599,858 (8 pages)—dated May 11, 2011.
Office action for co-pending U.S. Appl. No. 13/341,542 (8 pages)—dated Dec. 26, 2012.
Office action for co-pending U.S. Appl. No. 13/341,542 (7 pages)—dated Feb. 10, 2014.
Office action for co-pending U.S. Appl. No. 14/026,394 (6 pages)—dated Aug. 14, 2014.
Office action for co-pending U.S. Appl. No. 14/272,556 (14 pages)—dated Nov. 20, 2014.
Office action for co-pending U.S. Appl. No. 14/272,556 (12 pages)—dated Sep. 17, 2015.
Office action for co-pending U.S. Appl. No. 14/342,069 (17 pages)—dated Dec. 29, 2015.
Office action for co-pending U.S. Appl. No. 14/342,069 (22 pages)—dated Sep. 2, 2016.
Office action for co-pending U.S. Appl. No. 14/342,069 (21 pages)—dated Sep. 26, 2017.
Office action for co-pending U.S. Appl. No. 14/342,069 (21 pages)—dated Jun. 6, 2018.
Office action for co-pending U.S. Appl. No. 14/649,277 (9 pages)—dated Jul. 22, 2016.
Office action for co-pending U.S. Appl. No. 14/686,915 (8 pages)—dated Nov. 18, 2016.
Office action for co-pending U.S. Appl. No. 14/810,765 (7 pages)—dated Jan. 29, 2016.
Office action for co-pending U.S. Appl. No. 14/828,916 (8 pages)—dated Nov. 25, 2016.
Office action for co-pending U.S. Appl. No. 14/867,502 (9 pages)—dated Nov. 18, 2016.
Office action for co-pending U.S. Appl. No. 15/172,432 (16 pages)—dated Apr. 17, 2017.
Decision of PTAB in Inter Partes Reexamination of U.S. Pat. No. 7,888,445 (34 pages)—May 1, 2015.

\* cited by examiner

BINDER

CROSS-REFERENCE TO RELATED APPLICATIONS

This application is a continuation of U.S. application Ser. No. 15/714,150, filed Sep. 25, 2017, which is a continuation of U.S. application Ser. No. 14/649,452, filed Jun. 3, 2015, which is a U.S. national counterpart application of International Application Serial No. PCT/EP2013/075378, filed Dec. 3, 2013, under 35 U.S.C. § 371, which claims priority to GB Application Serial No. 1221873.1, filed Dec. 5, 2012, the entire disclosures of which are expressly incorporated by reference herein.

BACKGROUND OF THE INVENTION

The present invention relates to binder compositions with an improved amine component, and a method of manufacturing a collection of matter bound by said binder compositions. Generally, binders are useful in fabricating articles because they are capable of consolidating non- or loosely-assembled matter. For example, binders enable two or more surfaces to become united. In particular, binders may be used to produce products comprising consolidated fibers. Thermosetting binders may be characterized by being transformed into insoluble and infusible materials by means of either heat or catalytic action. Examples of a thermosetting binder include a variety of phenol-aldehyde, urea-aldehyde, melamine-aldehyde, and other condensation-polymerization materials like furane and polyurethane resins. Binder compositions containing phenol-aldehyde, resorcinol-aldehyde, phenol/aldehyde/urea, phenol/melamine/aldehyde, and the like are widely used for the bonding of fibers, textiles, plastics, rubbers, and many other materials.

The mineral wool and fiber board industries have historically used a phenol formaldehyde binder to bind fibers. Phenol formaldehyde type binders provide suitable properties to the final products; however, environmental considerations have motivated the development of alternative binders. One such alternative binder is a carbohydrate based binder derived from reacting a carbohydrate and a multiprotic acid, for example, U.S. Published Application No. 2007/0027283 and Published PCT Application WO2009/019235. Another alternative binder is the esterification products of reacting a polycarboxylic acid and a polyol, for example, U.S. Published Application No. 2005/0202224. Because these binders do not utilize formaldehyde as a reagent, they have been collectively referred to as formaldehyde-free binders.

One area of current development is to find a replacement for the phenol formaldehyde type binders across the entire range of products in the building and automotive sector (e.g. fiberglass insulation, particle boards, office panels, and acoustical sound insulation). In particular, the previously developed formaldehyde-free binders may not possess all of the desired properties for all the products in this sector. For example, acrylic acid and poly(vinylalcohol) based binders have shown promising performance characteristics. However, these are relatively more expensive than phenol formaldehyde binders, are derived essentially from petroleum-based resources, and have a tendency to exhibit lower reaction rates compared to the phenol formaldehyde based binder compositions (requiring either prolonged cure times or increased cure temperatures). Carbohydrate-based binder compositions are made of relatively inexpensive precursors and are derived mainly from renewable resources. However, these binders may also require reaction conditions for curing that are substantially different from those conditions under which the traditional phenol formaldehyde binder system is cured.

Specifically, a versatile alternative to the above-mentioned phenol formaldehyde binders is the use of carbohydrate polyamine binders which are polymeric binders obtained by reaction of carbohydrates with polyamines having at least one primary amine group. These carbohydrate polyamine binders are effective substitutes for phenol formaldehyde binders, since they possess similar or superior binding characteristics and are highly compatible to the established processes. Typically, the carbohydrate polyamine binders are prepared as a solution, such as an aqueous solution, and are subsequently applied onto the loosely assembled matter to be bound. The such wetted loosely assembled matter is then, for example, heat treated to cure the carbohydrate polyamine binder.

Nonetheless, the currently available binder compositions are sometimes linked with drawbacks such as potentially low reaction/curing rates and dissatisfactory internal bond strength and/or shelf life of the products obtained by using the above binder compositions, and thus there is still plenty of room for improvements to said binder compositions. Accordingly, the technical problem underlying the present invention is to provide binder compositions which exhibit improved properties such as excellent curing rates, longer shelf life, and improved internal bond strength of the products obtained by using the binder compositions.

SUMMARY OF THE INVENTION

In order to solve the above technical problem, as a first aspect, the present invention provides a binder composition comprising a polymeric product of at least one carbohydrate component and at least one amine component, wherein the at least one amine component comprises a polyethyleneimine.

DETAILED DESCRIPTION OF THE INVENTION

According to the present invention, the term "binder composition" is not particularly restricted and generally includes any polymeric product of a carbohydrate component and a specific amine component of the present invention, which may be used as a binder, e.g. for binding loosely assembled matter, either as such or upon further modification. According to the present invention, the at least one amine component comprises a polyethyleneimine. The polyethyleneimine may be a linear polyethyleneimine, i.e. a polyethyleneimine having only two primary amino groups at the ends of the polymer chain while having just secondary amino groups within the chain, or a branched polyethyleneimine which has a mixture of primary, secondary and tertiary amino groups. According to a preferred embodiment, the polyethyleneimine is a branched polyethyleneimine One advantage of branched polyethyleneimines is that they are generally soluble in water.

The average molecular weight of the polyethyleneimine of the present invention is not particularly limited. However, the average molecular weight is preferably in the range of 500 to 1,000,000 g/mol, more preferably in the range of 5,000 to 900,000 g/mol, and most preferably in the range of 25,000 to 800,000 g/mol. If the average molecular weight of the polyethyleneimine is too high, problems with respect to the viscosity of the solution may arise. The average molecular weight may be determined by a GPC method known to those skilled in the art. According to a preferred embodiment of the present invention, the polyethyleneimine has a ratio of primary amino groups to secondary+tertiary amino groups in the range of 1:2 to 1:1, more preferably in the range of 1:1.9 to 1:1.2, and most preferably in the range of 1:1.8 to 1:1.4. In this context, the expression "secondary+tertiary amino groups" refers to the total amount of secondary and tertiary amino groups. If the ratio of primary amino groups to secondary+tertiary amino groups is in the above ranges, high curing/reaction rates can be achieved. The above ratio may be determined by a $^{13}$NMR method known to those skilled in the art.

Preferably, the polyethyleneimine has a ratio of primary amino groups to secondary amino groups to tertiary amino groups in the range of 1:1.1:0.7 to 1:0.9:0.5, since high curing/reaction rates can be achieved if the above ratio is in this range. The above ratio may be determined by a $^{13}$NMR method known to those skilled in the art. According to a preferred embodiment, the polyethyleneimine has a viscosity in water at a concentration of 50 wt.-% at 25° C. of 100 to 50,000 mPa·s, more preferably 1000 to 40,000 mPa·s, still more preferably 5,000 to 30,000 mPa·s, and most preferably 11,000 to 25,000 mPa·s. If the viscosity of the polyethyleneimine is below or above these values, problems with respect to handling and/or reaction speed of the binder composition may arise. The viscosity in the present invention is determined in accordance with ISO 2555. According to the present invention, the term "carbohydrate component" is not specifically restricted and generally includes any carbohydrate compound which is capable of reacting with an amine component.

The amount of the carbohydrate component used in the binder composition of the present invention is not specifically limited and includes ranges of (based on the total amount of the binder composition) from 1 to 99 wt.-%, 1 to 90 wt.-%, 1 to 80 wt.-%, 1 to 70 wt.-%, 1 to 60 wt.-%, 1 to 50 wt.-%, 1 to 40 wt.-%, 1 to 30 wt.-%, 1 to 20 wt.-% and 1 to 10 wt.-%. Other specific ranges include from 20 to 95 wt.-%, 30 to 95 wt.-%, 35 to 95 wt.-%, 40 to 95 wt.-%, 45 to 95 wt.-%, 50 to 95 wt.-%, and 60 to 95 wt.-%. According to one embodiment of the above-defined binder composition, the at least one carbohydrate component is selected from the group consisting of monosaccharides, disaccharides, polysaccharides or a reaction product thereof. For example, the carbohydrate component may be a reducing sugar. As used herein, the term "reducing sugar" indicates one or more sugars that contain aldehyde groups, or that can isomerize, i.e., tautomerize, to contain aldehyde groups, which groups may be oxidized with, for example, Cu-ions to afford carboxylic acids.

According to the present invention, any such carbohydrate component may be optionally substituted, such as with hydroxy, halo, alkyl, alkoxy, and the like. In any such carbohydrate component, one or more chiral centers may be present, and both possible optical isomers at each chiral center are included in the invention described herein. Further, it is also to be understood that various mixtures, including racemic mixtures, or other diastereomeric mixtures of the various optical isomers of any such carbohydrate component, as well as various geometric isomers thereof, may be used in one or more embodiments described herein.

Moreover, while non-reducing sugars, for instance sucrose, may not be preferable, they may nonetheless be useful within the scope of the present invention by in-situ conversion to a reducing sugar. Further, it is also understood that a monosaccharide, a disaccharide, or a polysaccharide may be partially reacted with a precursor to form a carbohydrate reaction product. To the extent that the carbohydrate reaction product is derived from a monosaccharide, a disaccharide, or a polysaccharide, and maintains similar reactivity with the amine component to form reaction products similar to those of a monosaccharide, a disaccharide, or a polysaccharide with an amine component, the carbohydrate reaction product is within the scope of term carbohydrate component.

Preferably, any carbohydrate component should be sufficiently nonvolatile to maximize its ability to remain available for reaction with the amine component. The carbohydrate component may be a monosaccharide in its aldose or ketose form, including a triose, a tetrose, a pentose, a hexose, or a heptose; or a polysaccharide; or combinations thereof. For example, when a triose serves as the carbohydrate component, or is used in combination with other reducing sugars and/or a polysaccharide, an aldotriose sugar or a ketotriose sugar may be utilized, such as glyceraldehyde and dihydroxyacetone, respectively. When a tetrose serves as the carbohydrate component, or is used in combination with other reducing sugars and/or a polysaccharide, aldotetrose sugars, such as erythrose and threose; and ketotetrose sugars, such as erythrulose, may be utilized.

When a pentose serves as the carbohydrate component, or is used in combination with other reducing sugars and/or a polysaccharide, aldopentose sugars, such as ribose, arabinose, xylose, and lyxose; and ketopentose sugars, such as ribulose, arabulose, xylulose, and lyxulose, may be utilized. When a hexose serves as the carbohydrate component, or is used in combination with other reducing sugars and/or a polysaccharide, aldohexose sugars, such as glucose (i.e., dextrose), mannose, galactose, allose, altrose, talose, gulose, and idose; and ketohexose sugars, such as fructose, psicose, sorbose and tagatose, may be utilized. When a heptose serves as the carbohydrate component, or is used in combination with other reducing sugars and/or a polysaccharide, a ketoheptose sugar such as sedoheptulose may be utilized. Other stereoisomers of such carbohydrate components not known to occur naturally are also contemplated to be useful in preparing the binder compositions as described herein. In one embodiment, the carbohydrate component is high fructose corn syrup (HFCS).

As mentioned above, the carbohydrate component may be polysaccharide. For example, the carbohydrate component may be polysaccharide with a low degree of polymerization and includes e.g. molasses, starch, cellulose hydrolysates, or mixtures thereof. According to a specific example, the carbohydrate component is a starch hydrolysate, a maltodextrin, or a mixture thereof. While carbohydrates of higher degrees of polymerization may not be preferable, they may nonetheless be useful within the scope of the present invention by in-situ depolymerization. Furthermore, according to the present invention, the carbohydrate component may be used in combination with a non-carbohydrate polyhydroxy reactant. Examples of non-carbohydrate polyhydroxy reactants which can be used in combination with the carbohydrate component include, but are not limited to, trimethylolpropane, glycerol, pentaerythritol, polyvinyl alcohol, partially hydrolyzed polyvinyl acetate, fully hydrolyzed polyvinyl acetate, and mixtures thereof. For example, the non-carbohydrate polyhydroxy reactant is sufficiently non-volatile to maximize its ability to remain available for reaction with a monomeric or polymeric polyamine. Moreover, according to the present invention, the hydrophobicity of the non-carbohydrate polyhydroxy reactant may be a factor in determining the physical properties of a binder prepared as described herein.

In a preferred embodiment of the above-defined pre-reacted binder composition, the at least one carbohydrate component is selected from the group consisting of ribose, arabinose, xylose, lyxose, glucose (dextrose), mannose, galactose, allose, altrose, talose, gulose, idose, fructose, psicose, sorbose, dihydroxyacetone, sucrose and tagatose, as well as mixtures thereof. According to a preferred embodiment of the present invention, the weight ratio between the at least one carbohydrate component and the polyethyleneimine is from 95:5 to 70:30. According to one embodiment of the present invention, in the binder composition, the polymeric product is a product of the at least one carbohydrate component, the at least one amine component, and at least one additional crosslinker which is different from the amine component. The additional crosslinker is not specifically limited and includes any crosslinking agent known to those skilled in the art. Specific examples of the additional crosslinker include nitrogen-containing compounds such as amines, amino acids, inorganic ammonium salts, etc. Further examples include silicon-containing compounds such as silylethers, alkylsilyl ethers, silanes, etc. According to a preferred embodiment, the additional crosslinker is hexamethylenediamine (HMDA).

The amount of said additional crosslinker used in the binder composition of the present invention is not specifically limited and includes ranges of (based on the total amount of the binder composition) from 1 to 50 wt.-%, 1 to 45 wt.-%, 1 to 40 wt.-%, 1 to 35 wt.-%, 1 to 30 wt.-%, 1 to 25 wt.-%, 1 to 20 wt.-%, 1 to 15 wt.-%, 1 to 10 wt.-% and 1 to 5 wt.-%. Other specific ranges include from 5 to 50 wt.-%, 10 to 50 wt.-%, 15 to 50 wt.-%, 20 to 50 wt.-%, 25 to 50 wt.-%, 30 to 50 wt.-%, 35 to 50 wt.-%, 40 to 50 wt.-% and 45 to 50 wt.-%. According to a specific embodiment, the amount of the additional crosslinker used in the binder composition of the present invention is larger than the amount of the at least one amine component. The amount of the amine component used in the binder composition of the present invention is not specifically limited and includes ranges of (based on the total amount of the binder composition) from 1 to 50 wt.-%, 1 to 45 wt.-%, 1 to 40 wt.-%, 1 to 35 wt.-%, 1 to 30 wt.-%, 1 to 25 wt.-%, 1 to 20 wt.-%, 1 to 15 wt.-%, 1 to 10 wt.-% and 1 to 5 wt.-%. Other specific ranges include from 5 to 50 wt.-%, 10 to 50 wt.-%, 15 to 50 wt.-%, 20 to 50 wt.-%, 25 to 50 wt.-%, 30 to 50 wt.-%, 35 to 50 wt.-%, 40 to 50 wt.-% and 45 to 50 wt.-%. According to a preferred embodiment of the present invention, the additional crosslinker is hexamethylenediamine (HMDA). When the binder composition additionally comprises HMDA, a ratio carbohydrate:polyethyleneimine:HMDA in the range of 78:2:20 to 74:7:19 is particularly preferable. In this case, the curing/reaction rate of the binder composition as well as the bond strength e.g. of resulting fiber products is advantageously improved.

In a further aspect, the present invention provides a binder composition comprising a water-soluble pre-reacted binder and a second amine component, wherein the water-soluble pre-reacted binder comprises the reaction product(s) of at least one carbohydrate component and at least one first amine component, wherein the ratio of the reactive nitrogen-containing groups of the at least one first amine component to the carbonyl groups of the at least one carbohydrate component is substoichiometric such that there is no full conversion of the at least one carbohydrate component, and wherein the second amine component comprises a polyethyleneimine.

Herein, the term "reactive nitrogen-containing group" is not particularly restricted and includes any nitrogen-containing groups in the first amine component which are capable of reacting with the carbohydrate component. Specifically, examples of such reactive nitrogen-containing groups include primary, secondary, tertiary and quaternary amino groups. As used herein, the expression "that there is no full conversion of the at least one carbohydrate component" means that some of the initial carbonyl groups of the carbohydrate component have not reacted with the first amine component and are still present, since the carbonyl groups of the carbohydrate component are in excess with respect to the reactive nitrogen-containing groups of the first amine component. According to a preferred embodiment, the pre-reacted binder as defined above comprises at least 10% of the initial carbonyl groups provided by the carbohydrate component. Further examples of the number of unreacted carbonyl groups in the pre-reacted binder include at least 15%, at least 20%, at least 25%, at least 30%, at least 35%, at least 40%, at least 50%, at least 60% or at least 75% of the carbonyl groups present in the carbohydrate component before reaction with the first amine component.

According to the present invention, the term "pre-reacted binder" is not particularly restricted and generally includes any chemical composition obtained by reacting a carbohydrate component and an amine component, which may be used as a binder, e.g. for binding loosely assembled matter, either as such or upon further modification. The "at least one carbohydrate component" and "the (second) amine component comprising a polyethyleneimine" are the same as described above. Further, herein the "first amine component" is not particularly limited and includes any chemical compound, or mixture of compounds, which contains at least one amino group and which is capable of reacting with the at least one carbohydrate component to form a pre-reacted binder. According to one embodiment, in the pre-reacted binder, the at least one first amine component is $NH_3$, an inorganic amine or an organic amine comprising at least one primary amino group, as well as salts thereof. For example, as the first amine component $NH_3$ may be used as such (e.g. in form of an aqueous solution), as well as any type of inorganic and organic ammonium salts, as long as these salts are capable of reacting with the carbohydrate component defined above. Specific examples of inorganic ammonium salts include ammonium sulfate ($AmSO_4$), ammonium chloride, and ammonium nitrate.

According to the present invention, the first amine component may be a polyamine Herein, the term "polyamine" includes any organic compound having two or more amino groups, which may independently be substituted or unsubstituted. For example, the polyamine may be a primary polyamine. As used herein, a "primary polyamine" is an organic compound having two or more primary amino groups ($-NH_2$). Herein, the term "primary amino group" also includes amino groups in their salt forms, e.g. ammonium groups. Within the scope of the term primary polyamine are those compounds which can be modified in situ or isomerize to generate a compound having two or more primary amino groups (—NH$_2$). According to one embodiment of the present invention, the primary polyamine may be a molecule having the formula H$_2$N-Q-NH$_2$, wherein Q is an alkyl, cycloalkyl, heteroalkyl, or cycloheteroalkyl, each of which may be optionally substituted. For example, Q may be an alkyl group selected from a group consisting of $C_2$-$C_{24}$, an alkyl selected from a group consisting of $C_2$-$C_9$, an alkyl selected from a group consisting of $C_3$-$C_7$. According to a preferred embodiment, Q is a $C_6$ alkyl. According to another embodiment, Q may be a cyclohexyl, cyclopentyl or cyclobutyl, or a benzyl group.

As used herein, the term "alkyl" includes a chain of carbon atoms, which may optionally be branched. As used herein, the terms "alkenyl" and "alkynyl" independently include a chain of carbon atoms, which may optionally be branched, and include at least one double bond or triple bond, respectively. It is to be understood that alkynyl may also include one or more double bonds. It is to be further understood that alkyl is advantageously of limited length, including $C_1$-$C_{24}$, $C_1$-$C_{12}$, $C_1$-$C_8$, $C_1$-$C_6$, and $C_1$-$C_4$. It is to be further understood that alkenyl and/or alkynyl may each be advantageously of limited length, including $C_2$-$C_{24}$, $C_2$-$C_{12}$, $C_2$-$C_8$, $C_2$-$C_6$, and $C_2$-$C_4$. In particular, shorter alkyl, alkenyl, and/or alkynyl groups may add less lipophilicity to the compound and accordingly will have different reactivity towards the carbohydrate component and solubility in a binder solution.

As used herein, the term "cycloalkyl" includes a chain of carbon atoms, which may optionally be branched, where at least a portion of the chain is cyclic. Moreover, according to the present invention it is to be noted that "cycloalkylalkyl" is regarded as a subset of cycloalkyl, and that the term "cycloalkyl" also includes polycyclic structures. For example, such cycloalkyls include, but are not limited to, cyclopropyl, cyclopentyl, cyclohexyl, 2-methylcyclopropyl, cyclopentyleth-2-yl, adamantyl, and the like. As used herein, the term "cycloalkenyl" includes a chain of carbon atoms, which may optionally be branched, and includes at least one double bond, where at least a portion of the chain is cyclic.

According to the present invention, said at least one double bond may be in the cyclic portion of cycloalkenyl and/or the non-cyclic portion of cycloalkenyl. Moreover, it is to be understood that cycloalkenylalkyl and cycloalkylalkenyl are each regarded as subsets of cycloalkenyl. Moreover, according to the present invention "cycloalkyl" may be polycyclic. Examples of such cycloalkenyls include, but are not limited to, cyclopentenyl, cyclohexylethen-2-yl, cycloheptenylpropenyl, and the like.

Furthermore, the chain forming cycloalkyl and/or cycloalkenyl is advantageously of limited length, including $C_3$-$C_{24}$, $C_3$-$C_{12}$, $C_3$-$C_8$, $C_3$-$C_6$, and $C_5$-$C_6$. According to the present invention, shorter alkyl and/or alkenyl chains forming cycloalkyl and/or cycloalkenyl, respectively, may add less lipophilicity to the compound and accordingly will have different behavior.

As used herein, the term "heteroalkyl" includes a chain of atoms that includes both carbon and at least one heteroatom, and is optionally branched. Examples of such heteroatoms include nitrogen, oxygen, and sulfur. In certain variations, said heteroatoms also include phosphorus, and selenium. In one embodiment, a heteroalkyl is a polyether. As used herein, the term "cycloheteroalkyl" including heterocyclyl and heterocycle, includes a chain of atoms that includes both carbon and at least one heteroatom, such as heteroalkyl, and may optionally be branched, where at least a portion of the chain is cyclic. Similarly, examples of cycloheteroalkyl include, but are not limited to, tetrahydrofuryl, pyrrolidinyl, tetrahydropyranyl, piperidinyl, morpholinyl, piperazinyl, homopiperazinyl, quinuclidinyl, and the like.

Herein, the term "optionally substituted" includes the replacement of hydrogen atoms with other functional groups on the radical that is optionally substituted. Such other functional groups illustratively include, but are not limited to, amino, hydroxyl, halo, thiol, alkyl, haloalkyl, heteroalkyl, aryl, arylalkyl, arylheteroalkyl, nitro, sulfonic acids and derivatives thereof, carboxylic acids and derivatives thereof, and the like. Illustratively, any of amino, hydroxyl, thiol, alkyl, haloalkyl, heteroalkyl, aryl, arylalkyl, arylheteroalkyl, and/or sulfonic acid is optionally substituted. For example, the primary polyamine may be a diamine, triamine, tetraamine, or pentamine. According to one embodiment, the polyamine is a triamine selected from a diethylenetriamine, 1-piperazineethaneamine, or bis(hexamethylene)triamine. In another embodiment, the polyamine is a tetramine, for example triethylenetetramine. In another embodiment, the polyamine is a pentamine, for example tetraethylenepentamine.

One aspect of the primary polyamine is that it may possess low steric hindrance. For example, 1,2-diaminoethane, 1,4-diaminobutane, 1,5-diaminopentane, 1,6-diaminohexane, 1,12-diaminododecane, 1,4-diaminocyclohexane, 1,4-diaminobenzene, diethylenetriamine, triethylenetetramine, tetraethylenepentamine, 1-piperazine-ethaneamine, 2-methyl-pentamethylenediamine, 1,3-pentanediamine, and bis(hexamethylene)triamine, as well as 1,8-diaminooctane have low steric hindrance within the scope of the present invention. According to a preferred embodiment of the pre-reacted binder as defined above, the first amine component is the primary polyamine 1,6-diaminohexane (hexamethylenediamine, HMDA). In a further embodiment, the first amine component is 1,5-diamino-2-methylpentane (2-methyl-pentamethylenediamine) In another embodiment, the first amine component is the primary polyamine polyether-polyamine. For example, according to the present invention, said polyether-polyamine is a diamine or a triamine. In one embodiment, the polyether-polyamine is a trifunctional primary amine having an average molecular weight of 440 known as Jeffamine T-403 Polyetheramine (Huntsman Corporation). In a further embodiment, the first amine component may include a polymeric polyamine. For example, polymeric polyamines within the scope of the present invention include chitosan, polylysine, polyethylenimine, poly(N-vinyl-N-methyl amine), polyaminostyrene and polyvinylamines. In a specific example, the first amine component comprises a polyvinyl amine. As used herein, the polyvinyl amine can be a homopolymer or a copolymer. In a specific embodiment, the first and second amine components may be the same.

Herein, the term "water-soluble" is not specifically restricted and includes all grades of water-solubility of the pre-reacted binder as defined above. In particular, the term "water-soluble" includes water-solubility at 20° C. of 100 g/l or more, 150 g/l or more, 200 g/l or more, or 250 g/l or more. For example, the term "water-soluble" may include a water-solubility of the pre-reacted binder as defined above of 300 g/l or more, 400 g/l or more, 500 g/l or more or 600 g/l or more (at 20° C.). Also virtual infinitive water-solubility may be regarded to be within the scope of the present invention.

In this context, the expression "water-insoluble" according to the present invention relates to cases where the pre-reacted binder as defined above is essentially not soluble in water at 20° C. For example, the term insoluble includes a water-solubility at 20° C. of 50 g/l or less, 40 g/l or less, 30 g/l or less, or 20 g/l or less. Preferably, the term water-insoluble includes cases of water-solubility of 10 g/l or less, 5 g/l or less, 1 g/l or less or 0.1 g/l or less. According to the present invention, an aqueous solution containing 70 wt.-% of the above-defined pre-reacted binder preferably has a viscosity at 20° C. of at most 2000 mPa·s, wherein the viscosity of said aqueous solution does not increase by more than 500 mPa·s when left to stand at 20° C. for 12 hours.

For example, an aqueous solution containing 70 wt.-% of the above-defined pre-reacted binder (i.e. an aqueous solution containing 70% wt.-% of solids) may have an initial viscosity after its preparation of 100 to 1500 mPa·s, of 150 to 1200 mPa·s, of 200 to 800 mPa·s, of 220 to 600 mPa·s, or of 250 to 400 mPa·s. From the viewpoint of handling, a preferred viscosity is in the range of 280 to 350 mPa·s. Viscosity may be measured using a LV-Torque Brookfield Viscometer, spindle LV-63 at 60 rpm. Moreover, the viscosity of said aqueous solution should preferably not increase by more than 500 mPa·s when left to stand at 20° C. for 24 hours, 48 hours, 72 hours or 96 hours. According to a further preferred embodiment, the viscosity of said aqueous solution should not increase by more than 500 mPa·s within a week, 10 days, 12 days or two weeks. Longer periods, such as three or four weeks, or even two, three or more months, where the viscosity will not increase by more than 500 mPa·s are even more preferable.

According to a further embodiment, the amount by which the viscosity increases within the first 12 hours when leaving an 70 wt.-% aqueous solution of the pre-reacted binder to stand at 20° C. should preferably not exceed 450 mPa·s, or 400 mPa·s or even 350 mPa·s. Preferred increases in viscosity include increases of 300 mPa·s or less, 280 mPa·s or less, 250 c mPa·s or less and 200 mPa·s or less. According to the present invention, the above-defined time periods and increases in viscosity are not limited to the examples mentioned above and may be freely combined. For example, preferably, the above-mentioned 70 wt.-% aqueous solution of the pre-reacted binder does not increase in viscosity by more than 300 mPa·s within the first 48 hours after its preparation, or more than 400 mPa·s within two weeks after its preparation. Generally, if the viscosity of a respective aqueous solution becomes too high, e.g. caused by gelling, the pre-reacted binder may become unusable.

In one embodiment, the preparation of the pre-reacted binder is carried out in a solvent, such as water, to directly yield a binder solution usable for storage, shipping and then as a basis for preparing the final binder composition by addition of the second amine component. For example, the pre-reacted binder may be prepared in a concentrated aqueous solution of the carbohydrate component and the first amine component. The thus obtained concentrated pre-reacted binder solution may then be used, for example, at a later time and/or a different place, e.g. by dilution and addition of the second amine component, as an effective binder for consolidating loosely assembled matter.

The term "solvent" used herein is not particularly restricted and includes any solvent which may be used to carry out a reaction between the carbohydrate component and the amine component. For example, the solvent may be water, an organic solvent or mixtures thereof. Examples of organic solvents include alcohols, ethers, esters, ketones, aldehydes, alkanes and cycloalkanes.

According to one embodiment of the above-defined pre-reacted binder, the ratio of carbonyl groups in the carbohydrate component to reactive nitrogen-containing groups in the first amine component is 5:1 to 1:2 or 5:1 to 1:1. For example, the ratio of carbonyl groups to reactive nitrogen-containing groups may be 5:1 to 1:1.8, 5:1 to 1:1.5, 5:1 to 1:1.2, 5:1 to 1:1, 5:1 to 1:0.8 and 5:1 to 1:0.5. Further examples include ratios such as 4:1 to 1:2, 3.5:1 to 1:2, 3:1 to 1:2, 2.5:1 to 1:2, 2:1 to 1:2 and 1.5:1 to 1:2. According to the present invention, the upper and lower borders of the above-mentioned ratios may be freely combined. The pre-reacted binder as defined above may be obtained by reacting in a solvent the at least one carbohydrate component with the at least one first amine component at a temperature of at least 10° C. for a period of at least 5 minutes.

The temperature at which the pre-reacted binder is prepared is, however, not specifically restricted and includes temperatures in the range of 10 to 200° C., 15 to 180° C., 20 to 150° C. or 25 to 130° C. For example, the reaction temperature may range from 20 to 120° C., 25 to 110° C., 30 to 100° C. or 35 to 90° C. Specific examples of the temperature range include 40 to 90° C., 45 to 85° C. and 50 to 75° C. According to the present invention, the temperature at which the pre-reacted binder composition is prepared is not limited to the above ranges, and the upper and lower values of said ranges may be freely combined.

Similarly, the duration of the reaction to obtain the pre-reacted binder is not specifically restricted and includes durations of 5 to 240 minutes, 5 to 210 minutes, 5 to 180 minutes, 5 to 120 minutes, 5 to 90 minutes, 5 to 75 minutes 5 to 60 minutes, 5 to 40 minutes, 5 to 30 minutes and 5 to 25 minutes. Further examples include durations of 5 to 240 minutes, 10 to 240 minutes, 15 to 240 minutes, 20 to 240 minutes, 25 to 240 minutes, 30 to 240 minutes, 40 to 240 minutes, 45 to 240 minutes, 60 to 240 minutes, 120 to 240 minutes and 180 to 240 minutes. However, durations of up to one, two, three, four, five and six days, as well as durations of one, two or three weeks may also be reasonable within the scope of the present invention. According to the present invention, the duration for preparing the pre-reacted binder as defined above is not limited to the above examples and the upper and lower values of said ranges may be freely combined herein.

According to one embodiment, the above-defined pre-reacted binder further reacts with the second amine component to yield one or more melanoidins as a water-insoluble composition. In the present invention, the pre-reacted binder may function as a precursor or intermediate which may be further reacted with the second amine component to obtain a polymeric binder. For example, this polymeric binder contains high molecular weight melanoidins as Maillard reaction products which are essentially water-insoluble. According to a further embodiment, the molar ratio between the carbohydrate component and the first amine component in the pre-reacted binder is 0.5:1 to 30:1. Examples of further molar ratios include ratios of 0.7:1 to 25:1, 1:1 to 22:1, 1.5:1 to 20:1, 2:1 to 15:1, 2.5:1 to 10:1 or 3:1 to 8:1. However, according to the present invention, the molar ratio of carbohydrate component to first amine component is not limited to said ranges and the above upper and lower borders may be freely combined. Further, the pre-reacted binder may comprise one or more of a glycolaldehyde, glyceraldehyde, 2-oxopropanal, acetol, dihydroxyacetone, acetoin, butane-dione, ethanal, glucosone, 1-desoxyhexosulose, 3-desoxyhexosulose, 3-desoxypentosulose, 1,3-didesoxyhexosulose, glyoxal, methylglyoxal and diacetyl, wherein an aqueous solution containing 70 wt.-% of said pre-reacted binder has a viscosity at 20° C. of at most 2000 mPa·s, and the viscosity of said aqueous solution does not increase by more than 500 mPa·s when left to stand at 20° C. for 12 hours.

According to the present invention, the total content of said one or more above-mentioned compounds may be at least 10 wt.-%, at least 20 wt.-%, at least 30 wt.-%, at least 40 wt.-%, at least 50 wt.-%, at least 60 wt.-%, or at least 75 wt.-% of the pre-reacted binder. According to a preferred embodiment, the above-defined pre-reacted binder has an average molecular weight in the range of 200 to 5000 g/mol. According to the present invention, the average molecular weight of the pre-reacted binder composition may range from 300 to 4500 g/mol, from 400 to 4000 g/mol, from 450 to 3500 g/mol, from 500 to 300 g/mol or from 600 to 1500 g/mol. However, the average molecular weight of the pre-reacted binder is not limited to said ranges and the upper and lower values thereof may be freely combined.

According to the present invention, the pre-reacted binder may change over time in its chemical composition by continuing the reaction between the carbohydrate component and the first amine component. For example, even at relatively low temperatures, such as room temperature (20° C.) or below, the Maillard-type reactions may continue between the carbohydrate component and the first amine component towards the formation of melanoidins. As a consequence, ageing of the pre-reacted binder may lead to an accelerated final curing process of the binder and/or to an improved bond strength. According to a preferred embodiment of the binder composition comprising a water-soluble pre-reacted binder and a second amine component, the second amine component additionally comprises hexamethylenediamine (HMDA). When the second amine component additionally comprises hexamethylenediamine, a ratio pre-react:polyethyleneimine:HMDA in the range of 84:7:9 to 88:3:9 is particularly preferable. In this case, the curing/reaction rate of the binder composition as well as the bond strength e.g. of resulting fiber products is advantageously improved.

Various additives can be incorporated into the binder compositions of the present invention. These additives give the binders of the present invention additional desirable characteristics. For example, the binder may include a silicon-containing coupling agent. Many silicon-containing coupling agents are commercially available from the Dow-Corning Corporation, Evonik Industries, and Momentive Performance Materials. Illustratively, the silicon-containing coupling agent includes compounds such as silylethers and alkylsilyl ethers, each of which may be optionally substituted, such as with halogen, alkoxy, amino, and the like. In one variation, the silicon-containing compound is an amino-substituted silane, such as, gamma-aminopropyltriethoxy silane (SILQUEST A-1101; Momentive Performance Materials, Corporate Headquarters: 22 Corporate Woods Boulevard, Albany, N.Y. 12211 USA). In another variation, the silicon-containing compound is an amino-substituted silane, for example, aminoethylaminopropyltrimethoxy silane (Dow Z-6020; Dow Chemical, Midland, Mich.; USA). In another variation, the silicon-containing compound is gamma-glycidoxypropyltrimethoxysilane (SILQUEST A-187; Momentive). In yet another variation, the silicon-containing compound is an aminofunctional oligomeric siloxane (HYDROSIL 2627, Evonik Industries, 379 Interpace Pkwy, Parsippany, N.J. 07054).

The silicon-containing coupling agents are typically present in the binder in the range from about 0.1 percent to about 1 percent by weight based upon the dissolved binder solids (i.e., about 0.05% to about 3% based upon the weight of the solids added to the aqueous solution). These silicone containing compounds enhance the ability of the binder to adhere to the matter the binder is disposed on, such as glass fibers Enhancing the binder's ability to adhere to the matter improves, for example, its ability to produce or promote cohesion in non- or loosely-assembled substance(s). In another illustrative embodiment, a binder of the present invention may include one or more corrosion inhibitors. These corrosion inhibitors prevent or inhibit the eating or wearing away of a substance, such as, metal caused by chemical decomposition brought about by an acid. When a corrosion inhibitor is included in a binder of the present invention, the binder's corrosivity is decreased as compared to the corrosivity of the binder without the inhibitor present. In one embodiment, these corrosion inhibitors can be utilized to decrease the corrosivity of the mineral fiber-containing compositions described herein. Illustratively, corrosion inhibitors include one or more of the following, a dedusting oil, or a monoammonium phosphate, sodium metasilicate pentahydrate, melamine, tin(II) oxalate, and/or methylhydrogen silicone fluid emulsion. When included in a binder of the present invention, corrosion inhibitors are typically present in the binder in the range from about 0.5 percent to about 2 percent by weight based upon the dissolved binder solids.

A further aspect of the present invention relates to a method of manufacturing a collection of matter bound by a polymeric binder comprising the steps: (i) providing a collection of matter, (ii) providing the above-defined binder composition as a solution or dispersion, (iii) applying the solution or dispersion of step (ii) to the collection of matter, and (iv) applying heat to the collection of matter containing said solution or dispersion to cure the binder composition. Herein, the term "collection of matter" is not particularly restricted and includes any collection of matter which comprises fibers selected from the group consisting of mineral fibers (slag wool fibers, rock wool fibers, or glass fibers), aramid fibers, ceramic fibers, metal fibers, carbon fibers, polyimide fibers, polyester fibers, rayon fibers, and cellulosic fibers. Further examples of a collection of matter include particulates such as coal, sand or glass fibers, cellulosic fibers, such as wood shavings, sawdust, wood pulp, or ground wood, as well as other natural fibers such as jute, flax, hemp, and straw; wood veneers; facings, wood facings, particles, woven or non-woven materials (e.g. comprising fibers, notably of the type(s) referred to above). According to the present invention, step (iv) of applying heat to the collection of matter as defined in the above method is not particularly restricted and includes, for example, heating in an oven at a temperature of 100° C. to 350° C., depending on the type of matter, the amount of binder and other conditions.

Binders in accordance with the present invention may be used as binders in articles selected from the group consisting of: thermal insulation materials; mineral wool insulation (including glass wool insulation and stone wool insulation); wood boards; fiberboards; wood particle boards; chip boards; orientated strand board; medium density fiberboards; high pressure laminates. The binder compositions of the present invention advantageously overcome a variety of drawbacks known from common carbohydrate-based binders. Particularly, binder compositions of the present invention result in accelerated cure times, prolonged shelf life, and superior bond strength of resulting products. Moreover, the binder compositions of the present invention require a surprisingly low addition percentage and an advantageously low activation temperature for the curing process.

The present invention will be further illustrated in the following examples, without limitation thereto.

Example 1: Cure Rates of Polyethyleneimine with DMH

Figure 1:
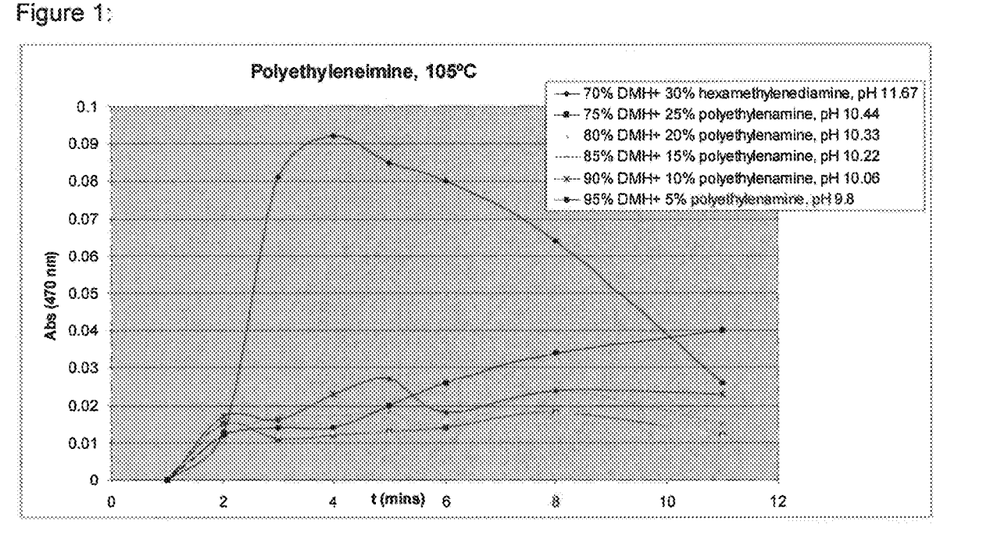
FIG. 1 shows cure rates of binders comprising DMH and polyethyleneimine.
Figure 2:
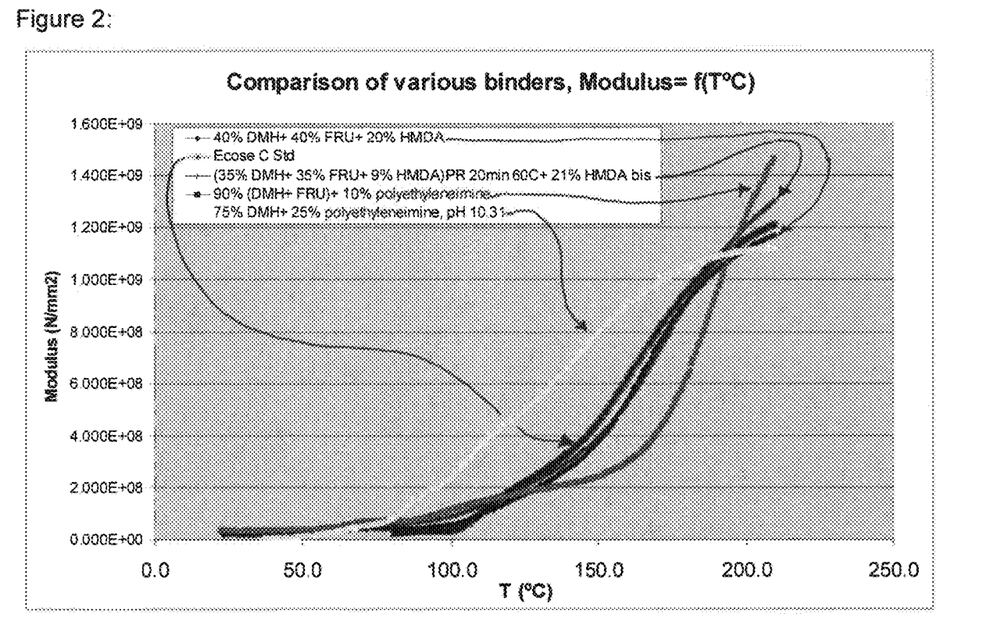
FIG. 2 shows dynamic mechanical analysis of polyethyleneimine binders.

Various binders comprising polyethyleneimine and dextrose monohydrate (DMH) were prepared in water (total solids made: 22.5%) at room temperature according to the compositions given in FIG. 1. Subsequently, the resulting binder compositions were compared to binders comprising hexamethylenediamine (HMDA) and DMH. At 105° C., it was observed that binders comprising more than 10 wt.-% of polyethyleneimine have higher cure rates than binders comprising HMDA (cf. FIG. 1). Moreover, a dynamical mechanical analysis (DMA) was performed on binder compositions to test the stiffness of the binder over a range of temperature. The DMA is carried out by soaking a filter paper in the respective binder composition, cutting a piece of the filter soaked in the binder, and then carefully attaching said filter in the DMA testing apparatus. Then, over a range of temperature, the DMA testing apparatus vibrates the piece of filter and measures and records the force required to do so. The respective graph (cf. FIG. 2) then shows the temperature at which a binder is cured, since at this temperature the binder/soaked filter gets stiffer. FIG. 2 clearly shows that the activation temperature of binders comprising polyethyleneimine is lower than that of binders comprising HMDA (cf. FIG. 2, in which: "FRU" means fructose; "PR 20 min 60 C" means pre-reacted for 20 min at 60° C.; "Ecose C Std" is "40% DMH+40% fructose+10% HMDA, pre-reacted for 30 min at 60° C.").

Example 2: Bond Strength Test

Figure 3:
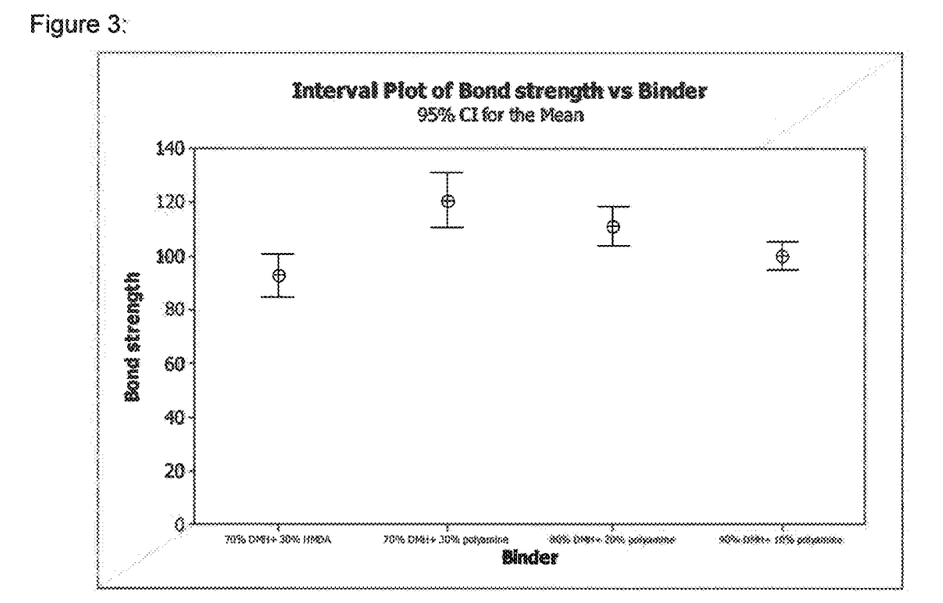
FIG. 3 shows bond strength of polyethyleneimine binders.

Various binders were tested for their bond strength using a veil test, which shows the strength of a binder. In the veil test, a respective binder composition is prepared (about 4% total solids made), a binder free veil is soaked in the respective binder composition, afterwards cured at 200° C., optionally weathered in an autoclave, and then tested with a tensiometer. The resulting values (N/mm$^2$) indicate the bond strength of the respective cured binder composition. As can be taken from the results shown in FIG. 3, those binders comprising 10%, 20% or 30% of polyethyleneimine resulted in a higher bond strength when compared to a standard binder comprising 30% of HMDA.

Example 3: Solids Made Vs. Solids Baked Out

Two different binder compositions (all amounts given in wt.-%) comprising polyethyleneimine were cured at 140° C. for 2 hours, and the factor "solids made on solids baked out" was determined. In this context, "solids made" relates to the amount of solids added in a binder formulation when prepared, whereas "solids baked out" relates to the remaining solids after the binder has been cured. When the condensation reactions take place during the polymerization of a binder, solids baked out are lower than solids made.

| Binder composition | Solids made | Solids baked out | Factor |
|---|---|---|---|
| 45% DMH + 45% fructose + 10% polyethyleneimine | 67.5% | 51.84% | 1.3 |
| 40% DMH + 40% fructose + 20% polyethyleneimine | 67.5% | 51.72% | 1.3 |

It was observed that the binder compositions comprising polyethyleneimine show an advantageously low factor of 1.3, whereas conventional binder compositions comprising ammonia or HMDA show factors of 1.5 and 1.4, respectively. Accordingly, in a binder composition comprising polyethyleneimine less water is lost during curing than in conventional binder compositions. Such a low Factor is advantageous e.g. in the manufacture of timber board products.

Example 4: Shelf Life

The binder compositions of Example 3 comprising polyethyleneimine show a low factor "solids made on solids baked out". Therefore, due to the higher resulting solids baked out, it is possible to prepare compositions having lower solids content. Accordingly, the binder composition comprising 20 wt.-% of polyethyleneimine of Example 3 gelled after four days, while the binder composition comprising 10 wt.-% of polyethyleneimine of Example 3 remains even liquid after more than four days at room temperature, which is highly superior when compared to the shelf life of a conventional binder composition comprising HMDA and no pre-react, which gels straight away due to hydrogen bonding.

Example 5: Characteristics of Binder Compositions Comprising Lupasol

In the following, binder compositions comprising various polyethyleneimines (PEI) sold under the brand name Lupasol by BASF were tested with respect to cure rates and bond strength.

| PEI No. | Brand name | Viscosity (mPa · s) at concentration | Average molecular weight (g/mol) | Ratio primary/ secondary/ tertiary amino groups |
|---|---|---|---|---|
| 1 | Lupasol P | 25.000 at 50 wt.-% | 750.000 | 1:1.07:0.77 |
| 2 | Lupasol FG | 5.000 at 99 wt.-% | 800 | 1:0.82:0.53 |
| 3 | Lupasol PS | 1.700 at 33 wt.-% | 750.000 | 1:1.07:0.77 |
| 4 | Lupasol HF | 11.000 at 56 wt.-% | 25.000 | 1:1.20:0.76 |
| 5 | Lupasol G100 | 1.100 at 50 wt.-% | 5.000 | 1:1.05:0.76 |

Example 5.1: Gel Time of Binder Compositions Comprising Various Kinds of Lupasol The kinetics of various binder compositions each comprising a pre-reacted binder (41.0 wt.-% DMH+41.0 wt.-% fructose+10.3 wt.-% HMDA) and 7.7 wt.-% of one of the above-defined polyethyleneimines No. 1 to 5 were characterized with a gel test, using Gelnorm (cf. FIG. 4). In this context, "Gelnorm" is a gel timer composed of a heating unit and a timer. The binder composition is poured into a test tube inserted in the heating unit, set at 100° C. A rod connected to the time is plunged in the binder. During heating, the rod goes up and down in the binder solution. When the binder gels (due to polymerization), the rod cannot move anymore, and the timer stops to display the gel time.

Figure 4:
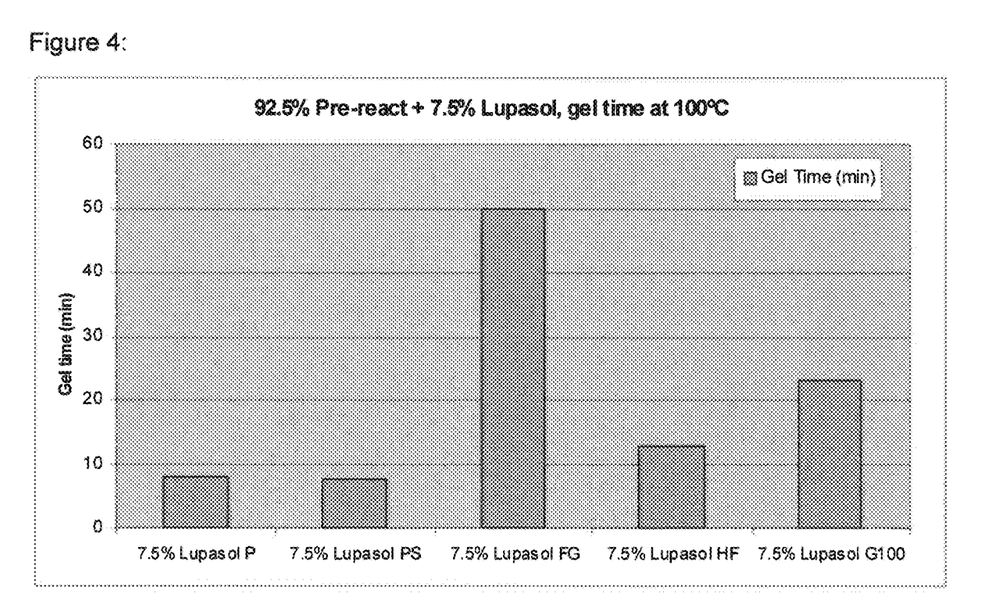
FIG. 4 shows gel time of binder compositions comprising Lupasol.

As FIG. 4 clearly shows, particularly those binder compositions comprising polyethyleneimines No. 1 and 2 show advantageously fast gel times.

Example 5.2: Gel Time of Binder Compositions Comprising Lupasol P and HMDA

A pre-reacted binder (PR) comprising 44.44 wt.-% DMH+44.44 wt.-% fructose+11.11 wt.-% HMDA was prepared (pre-reacted for 20 min at 60° C.). Thereafter, several binder compositions comprising the above pre-reacted binder, Lupasol P and HMDA were characterized with the above-described gel test. As a reference, a binder composition comprising the above pre-reacted binder and HMDA without Lupasol P was also characterized. The tested binder compositions are listed in the following table:

| Composition No. | Components in wt.-% | Amount of pre-react (g) | Amount of HMDA (g) | Amount of Lupasol P (g) | Amount of water (g) |
|---|---|---|---|---|---|
| 1 (reference) | 81.8% PR + 18.2% HMDA | 32.14 | 7.14 | | 10.71 |
| 2 | 81.8% PR + 18.2% Lupasol P | 32.14 | | 7.86 | 7.86 |
| 3 | 90% PR + 10% Lupasol P | 35.36 | | 5.5 | 9.14 |
| 4 | 90% PR + 5% HMDA + 5% Lupasol P | 35.36 | 1.96 | 2.75 | 9.92 |
| 5 | 85.7% PR + 9.5% HMDA + 4.8% Lupasol P | 33.66 | 3.74 | 2.62 | 9.97 |
| 6 | 87.3% PR + 9.7% HMDA + 3% Lupasol P | 34.33 | 3.81 | 1.6 | 10.25 |
| 7 | 84.1% PR + 9.3% HMDA + 6.6% Lupasol P | 34.33 | 3.67 | 3.6 | 9.39 |

Figure 5:
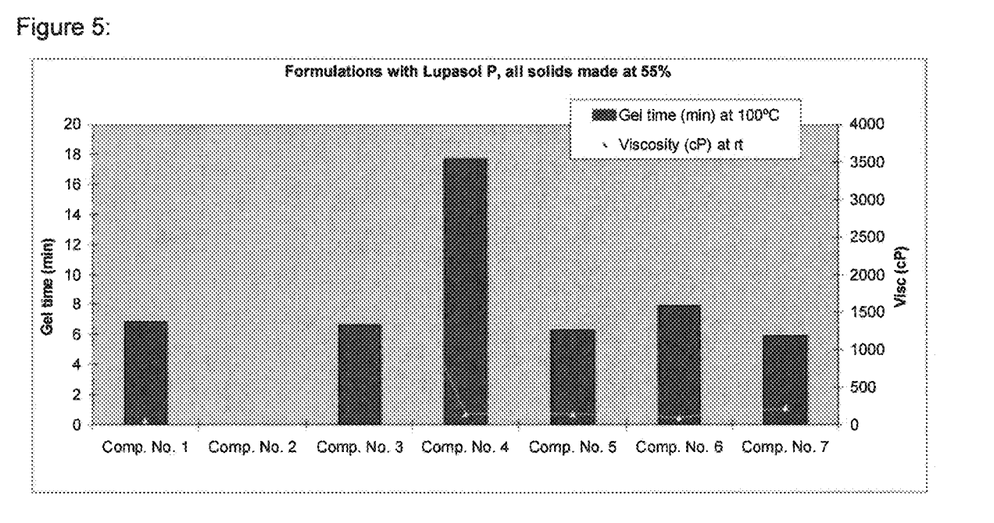
FIG. 5 shows gel time of binder compositions comprising Lupasol P and HMDA.
Figure 6:
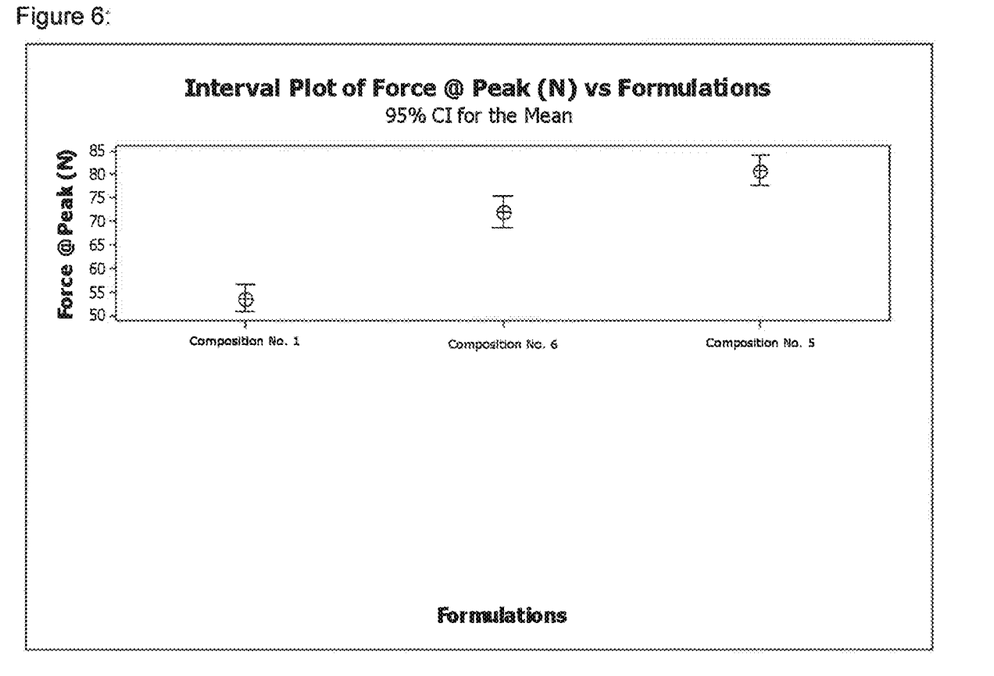
FIG. 6 shows an interval plot of force @ peak vs. Composition Nos. 1, 5 and 6.

The results of the gel test are depicted in FIG. 5. Compositions No. 5 and 7 (containing 4.8 wt.-% and 6.6 wt.-% of Lupasol P, respectively) react faster than the fastest standard binder composition (Composition No. 1, comprising only HMDA as amine component). Comparing Compositions No. 1 and No. 5, it becomes evident that replacing some of the HMDA by even a smaller amount of Lupasol P advantageously increases the reaction rate. When increasing the solids content, the viscosity increases as the gel time decreases. For example, composition No. 5 can be conveniently used at up to 60% solids made. However, at 65% solids made, the viscosity of Composition No. 5 is already high (above 500 mPa·s).

Example 5.3: Strength of a Binder Composition Comprising Lupasol P

Coincidentally, when performing the veil test as described in Example 2 with Compositions Nos. 1, 5 and 6, the veil's LOI also increases with addition of Lupasol P. In this context, LOI is the "Loss on Ignition", which is determined according to EN 13820:2003. Advantageously, increase in LOI generally also results in a strength improvement as well.

What is claimed is:

1. A method of manufacturing an article selected from the group consisting of: thermal insulation materials; mineral wool insulation; wood boards; fiberboards; wood particle boards; chip boards; oriented strand board; medium density fiberboards; high pressure laminates; non-woven materials comprising fibers selected from the group consisting of mineral fibers, slag wool fibers, rock wool fibers, glass fibers, aramid fibers, ceramic fibers, metal fibers, carbon fibers, polyimide fibers, polyester fibers and rayon fibers; the article comprising a collection of matter bound by a polymeric binder, the method comprising the steps of:
   (i) providing the collection of matter,
   (ii) applying a solution or dispersion of a binder composition to the collection of matter, and
   (iii) applying heat to the collection of matter containing said solution or dispersion to cure the binder composition to form the article,
   characterized in that the binder composition comprises a polymeric product of at least one reducing sugar, at least one amine component and an additional crosslinker comprising hexamethylenediamine (HMDA),
   wherein the at least one amine component comprises a branched polyethyleneimine having an average molecular weight in the range of 5,000 to 900,000 g/mole, and
   wherein the ratio of reducing sugar:polyethyleneimine:HMDA is in a range of 78:2:20 to 74:7:19.

2. The method of claim 1, wherein the average molecular weight of the polyethyleneimine is in the range of 25,000 to 800,000 g/mole.

3. The method of claim 1, wherein the polyethyleneimine has a ratio of primary amino groups to the sum of secondary and tertiary amino groups in a range of 1:2 to 1:1.

4. The method of claim 1, wherein the polyethyleneimine has a ratio of primary amino groups to secondary amino groups to tertiary amino groups in a range of 1:1.1:0.7 to 1:0.9:0.5.

5. The method of claim 1, wherein the polyethyleneimine has a viscosity in water at a concentration of 50 wt.-% (25° C.) in a range of 100 to 50,000 mPa·s.

6. The method of claim 1, wherein the at least one reducing sugar is selected from the group consisting of a reducing sugar obtained by in-situ conversion of a non-reducing sugar, monosaccharides, disaccharides, polysaccharides and reaction products thereof.

7. The method of claim 6, wherein the at least one reducing sugar is selected from the group consisting of ribose, arabinose, xylose, lyxose, glucose (dextrose), mannose, galactose, allose, altrose, talose, gulose, idose, fructose, psicose, sorbose, dihydroxyacetone, sucrose, tagatose and mixtures thereof.

8. The method of claim 1, wherein the weight ratio between the at least one reducing sugar and the amine component is in the range of 95:5 to 70:30.

9. The method of claim 1, wherein the collection of matter is selected from the group consisting of mineral fibers, slag wool fibers, rock wool fibers, glass fibers, aramid fibers, ceramic fibers, metal fibers, carbon fibers, polyimide fibers, polyester fibers, rayon fibers and cellulosic fibers.

10. The method of claim 9, wherein the cellulosic fibers comprise matter selected from the group consisting of wood shavings, sawdust, wood pulp, ground wood, jute, flax, hemp and straw.

* * * * *